(12) United States Patent
Mori

(10) Patent No.: US 7,348,976 B2
(45) Date of Patent: Mar. 25, 2008

(54) THREE-DIMENSIONAL SHAPE DISPLAY PROGRAM, THREE-DIMENSIONAL SHAPE DISPLAY METHOD, AND THREE-DIMENSIONAL SHAPE DISPLAY APPARATUS

(75) Inventor: Hiromi Mori, Kanagawa (JP)

(73) Assignee: Digital Process Ltd., Kanagawa (JP)

( * ) Notice: Subject to any disclaimer, the term of this patent is extended or adjusted under 35 U.S.C. 154(b) by 424 days.

(21) Appl. No.: 10/911,737

(22) Filed: Aug. 5, 2004

(65) Prior Publication Data

US 2005/0078109 A1 Apr. 14, 2005

Related U.S. Application Data

(63) Continuation of application No. PCT/JP02/01000, filed on Feb. 6, 2002.

(51) Int. Cl.
*G06T 17/00* (2006.01)

(52) U.S. Cl. ..................................... 345/423

(58) Field of Classification Search ..................... None
See application file for complete search history.

(56) References Cited

U.S. PATENT DOCUMENTS

| | | | |
|---|---|---|---|
| 5,966,140 A * | 10/1999 | Popovic et al. | 345/441 |
| 6,222,553 B1 | 4/2001 | DeRose et al. | |
| 6,356,263 B2 * | 3/2002 | Migdal et al. | 345/423 |
| 6,373,491 B1 | 4/2002 | Sasaki | |
| 6,437,791 B1 * | 8/2002 | Hopkins | 345/582 |
| 6,600,485 B1 * | 7/2003 | Yoshida et al. | 345/419 |
| 6,806,874 B2 * | 10/2004 | Biermann et al. | 345/420 |
| 6,806,876 B2 * | 10/2004 | Klein | 345/428 |
| 7,088,363 B2 * | 8/2006 | Kase et al. | 345/424 |
| 7,138,999 B2 * | 11/2006 | Alliez et al. | 345/423 |
| 2007/0057938 A1 * | 3/2007 | Usami et al. | 345/419 |

FOREIGN PATENT DOCUMENTS

| | | |
|---|---|---|
| EP | 996 094 | 4/2000 |
| JP | 2001-250129 A | 9/2001 |

OTHER PUBLICATIONS

Hoppe. Progressive Meshes. Proceedings of the 23rd Annual Conference on Computer Graphics and Interactive Techniques. ACM Press. 1996. p. 99-108.*

(Continued)

*Primary Examiner*—Ulka Chauhan
*Assistant Examiner*—Peter-Anthony Pappas
(74) *Attorney, Agent, or Firm*—Staas & Halsey LLP

(57) ABSTRACT

A three-dimensional shape is displayed at a high speed on the basis of compressed data. A subdivision pattern for at least one face that forms the three-dimensional shape is determined on the basis of three-dimensional shape data that defines the three-dimensional shape by the face. At the same time a curved face shape of the face is determined on the basis of the position of the vertices of the face and the direction of normals at the vertices defined in advance in the three-dimensional shape data. Then the determined curved face shape is subdivided according to the determined subdivision pattern and a plurality of faces are generated on the curved face shape. A three-dimensional shape formed by the plurality of faces generated is displayed.

14 Claims, 30 Drawing Sheets

TRIANGLE SUBDIVISION PATTERN

| SUBDIVISION NUMBER FOR EACH EDGE | SUBDIVISION PATTERN | SUBDIVIDED FIGURE |
|---|---|---|
| ① N, N×a1, N×a2 | N  N  N | |
| ② 1, N, N×a3 | 1  N  N | |
| ③ 1, 1, N | 1  1  N | |
| ④ 1,1,1 | 1  1  1 | |

OTHER PUBLICATIONS

Biermann et al. Piecewise Smooth Subdivision Surfaces with Normal Control. Proceedings of the 27th Annual Conference on Computer Graphics and Interactive Techniques. ACM Press. 2000. p. 113-120.*

Japanese Office Action in corresponding Japanese Patent Application No. 2003-566802 dated Apr. 10, 2007 (3 pages), (Partial English Trans. 2 pages).

Patent Abstract of Japan, Publication No. 11-296686, published Oct. 29, 1999.

Patent Abstract of Japan, Publication No. 2001-250129, published Sep. 14, 2001.

ISR in corresponding PCT/JP02/01000, Apr. 26, 2002.

* cited by examiner

TRIANGLE SUBDIVISION PATTERN

| SUBDIVISION NUMBER FOR EACH EDGE | SUBDIVISION PATTERN | SUBDIVIDED FIGURE |
|---|---|---|
| ① N, N×a1, N×a2 | N  N  N | |
| ② 1, N, N×a3 | 1  N  N | |
| ③ 1, 1, N | 1  1  N | |
| ④ 1, 1, 1 | 1  1  1 | |

FIG. 14

RECTANGLE SUBDIVISION PATTERN

| SUBDIVISION NUMBER FOR EACH EDGE | SUBDIVISION PATTERN | SUBDIVIDED FIGURE |
|---|---|---|
| ① M, M×b1, N, N×b2 | M  M  N  N |  |
| ② 1, M, 1, N | 1  M  1  N <br> M ≦ N |  |
| ③ 1, M, N | ▲  1  M  N |  |
| ④ 1, N, N | ▲  1  N  N |  |

THREE-DIMENSIONAL SHAPE DISPLAY PROGRAM, THREE-DIMENSIONAL SHAPE DISPLAY METHOD, AND THREE-DIMENSIONAL SHAPE DISPLAY APPARATUS

This application is a continuing application, filed under 35 U.S.C. §111(a) of International Application PCT/JP02/01000, filed Feb. 6, 2002.

BACKGROUND OF THE INVENTION (1) Field of the Invention

This invention relates to a three-dimensional shape display program, three-dimensional shape display method, and three-dimensional shape display apparatus for displaying the shape of an object in a three-dimensional space and, more particularly, to a three-dimensional shape display program, three-dimensional shape display method, and three-dimensional shape display apparatus for reproducing an original shape on the basis of compressed data.

(2) Description of the Related Art

In recent years various parts have generally been represented in a three-dimensional space by three-dimensional computer-aided design (CAD). For example, each of parts which make up a machine having a complex structure is represented by three-dimensional CAD data. As a result, by collecting CAD data (solid model) for individual parts, processes, such as an assembly examination, a layout examination, and an interference examination, can be performed easily on a computer. Such processes are called a digital mock-up and are widely used especially in the automobile and aviation industries.

Usually precise representation using highly accurate geometry and topology is used for three-dimensional CAD data. Furthermore, the three-dimensional CAD data includes constraints and a shape generation history for parametric deformation. The three-dimensional CAD data also includes display data for increasing its display speed. Therefore, a large amount of data is handled in three-dimensional CAD and a vast amount of data is necessary for preparing a digital mock-up by collecting parts. As a result, a vast amount of data must be processed even in the case of displaying only a three-dimensional shape without editing data.

In order to solve this problem, in the automobile and aviation industries CAD data is converted into display polygon data, such as virtual reality modeling language (VRML) data, and is displayed by a viewer used exclusively for digital mock-ups. By using the display polygon data, the process of checking a shape can be performed easily.

However, CAD data has recently become more detailed (the amount of data has increased because of more precise definition). As a result, the progress of hardware and software cannot keep up with this change and it has become difficult to handle the whole of a product even by the use of a dedicated viewer. For example, CAD data indicative of the structure of an automotive engine is converted into 0.5 to 1 gigabyte of display polygon data with an error of 0.1 mm. This means that CAD data indicative of the structure of an automobile will be converted into a total of 10 gigabytes or more of display polygon data. Accordingly, a computer which executes the viewer needs a large capacity memory and hard disk drive for storing the display polygon data.

Therefore, techniques for compressing display data indicative of a three-dimensional shape are proposed. For example, a method using a Bezier's triangular patch or Gregory patch (lattice=XVL) is proposed. By using such a method, the amount of data stored in the hard disk drive can be reduced. However, when data is read into a memory, it is converted into polygon data. Accordingly, the amount of data stored in the memory does not reduce. On the other hand, there is a method for holding a compressed three-dimensional shape in a memory and subdividing a polygon according to a display scale. This method is called a subdivision method. When a display scale is high, the probability that many parts will be outside the field of view (screen) is high. Accordingly, a central processing unit (CPU) resource saved by using view frustum culling (technique for omitting objects outside the field of view) can be allocated for polygon subdivision calculation. This is the reason why the subdivision method is appropriate.

An example of the subdivision method is disclosed in U.S. Pat. No. 6,222,553. In this invention, control points for a non-uniform rational B-spline (NURBS) curve or the like are used for representation. An original shape is subdivided by lines drawn from an intermediate point of a curve that forms the shape to the other edges of the shape.

With the conventional subdivision method, the amount of space in a memory to be used and file size can be reduced. However, the load on a computer caused by polygon subdivision calculation will increase significantly. In addition, a data compression effect by the conventional subdivision method is not sufficient to collaborate on a large amount of data from remote locations by the use of the world wide web or the like.

In the invention disclosed in U.S. Pat. No. 6,222,553, for example, to subdivide a shape by lines drawn from an intermediate point of a curve to the other edges of the shape, all of the edges will be subdivided even if an edge (straight edge, for example) which does not need to be subdivided is included. As a result, unnecessary subdivision is performed and the processing load increases. Furthermore, control points for a NURBS curve or the like must be set for every edge. This will contribute to an increase in the amount of data.

SUMMARY OF THE INVENTION

The present invention was made under the background circumstances described above. An object of the present invention is to provide a three-dimensional shape display program, three-dimensional shape display method, and three-dimensional shape display apparatus capable of displaying a three-dimensional shape at a high speed on the basis of compressed data.

In order to solve the above problem, a three-dimensional shape display program for making a computer perform the process of displaying the shape of an object shown in FIG. 1 in a three-dimensional space is provided in a first embodiment of the present invention. The computer for executing the three-dimensional shaped is play program according to the present invention first determines a pattern (subdivision pattern) according to which at least one face that forms a three-dimensional shape is subdivided on the basis of three-dimensional shape data 2 that defines the three-dimensional shape by the face (step S2). At the same time the computer determines a curved face shape (surface) of the face on the basis of the position of the vertices of the face and the direction of normals at the vertices defined in advance in the three-dimensional shape data 2 (step S3). Then the computer subdivides the determined curved face shape according to the determined subdivision pattern and generates a plurality of faces on the curved face shape (step S4). The computer displays a three-dimensional shape formed by the plurality of faces generated (step S5).

By making any computer execute this three-dimensional shape display program, a curved face shape corresponding to the direction of normals and the like defined for a face included in the three-dimensional shape data 2 is determined and is subdivided into a plurality of faces. A three-dimensional shape formed by the plurality of faces generated by the subdivision is displayed.

A three-dimensional shape display method for displaying the shape of an object in a three-dimensional space with a computer comprising the steps of determining a subdivision pattern for at least one face that forms a three-dimensional shape on the basis of three-dimensional shape data that defines the three-dimensional shape by the face and determining a curved face shape of the face on the basis of the position of the vertices of the face and the direction of normals at the vertices defined in advance in the three-dimensional shape data; subdividing the determined curved face shape according to the determined subdivision pattern and generating a plurality of faces on the curved face shape; and displaying a three-dimensional shape formed by the plurality of faces generated is provided in a second embodiment of the present invention.

By using this three-dimensional shape display method, a curved face shape corresponding to the direction of normals and the like defined for a face included in the three-dimensional shape data is determined and is subdivided into a plurality of faces. A three-dimensional shape formed by the plurality of faces generated by the subdivision is displayed.

A three-dimensional shape display apparatus for displaying the shape of an object in a three-dimensional space comprising a subdivision pattern determination section for determining a subdivision pattern for at least one face that forms a three-dimensional shape on the basis of three-dimensional shape data that defines the three-dimensional shape by the face; a curved face shape determination section for determining a curved face shape of the face on the basis of the position of the vertices of the face and the direction of normals at the vertices defined in advance in the three-dimensional shape data; a face generation section for subdividing the curved face shape determined by the curved face shape determination section according to the subdivision pattern determined by the subdivision pattern determination section and generating a plurality of faces on the curved face shape; and a display section for displaying a three-dimensional shape formed by the plurality of faces generated by the face generation section is provided in a third embodiment of the present invention.

In this three-dimensional shape display apparatus, the subdivision pattern determination section determines a subdivision pattern for at least one face that forms a three-dimensional shape on the basis of three-dimensional shape data that defines the three-dimensional shape by the face. The curved face shape determination section determines a curved face shape of the one or more faces on the basis of the position of the vertices of the one or more faces and the direction of normals at the vertices defined in advance in the three-dimensional shape data. Then the face generation section subdivides the curved face shape determined by the curved face shape determination section according to the subdivision pattern determined by the subdivision pattern determination section and generates a plurality of faces on the curved face shape. The display section displays a three-dimensional shape formed by the plurality of faces generated by the face generation section.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 14 shows different triangle subdivision patterns.

DESCRIPTION OF THE PREFERRED EMBODIMENTS

An embodiment of the present invention will now be described with reference to the drawings.

An overview of the present invention applied to embodiments will be given first and then the contents of the embodiment will be described concretely.

Figure 1:
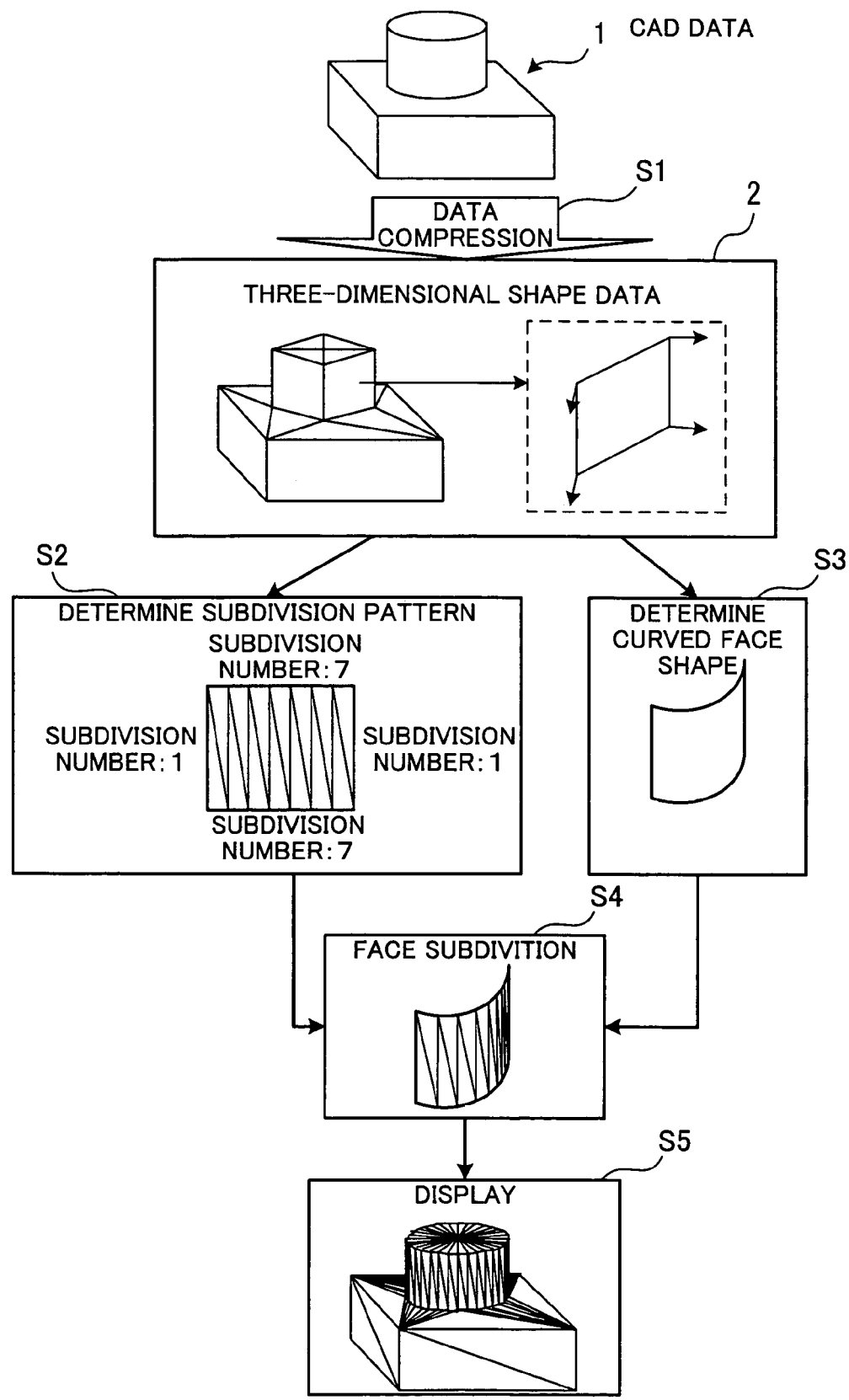
FIG. 1 is a schematic view for describing the present invention applied to an embodiment.

FIG. 1 is a schematic view for describing the present invention applied to an embodiment. In the present invention, a three-dimensional shape display program for making a computer perform the process of displaying the shape of an object in a three-dimensional space is provided. The computer performs the process shown in FIG. 1 on the basis of this three-dimensional shape display program.

The computer compresses CAD data 1 to generate compressed three-dimensional shape data 2. The CAD data 1 includes data for defining a shape and this data is compressed. For example, a complex curved face shape is replaced by a plurality of faces each having a simple shape as a result of the data compression.

Then the computer determines a subdivision pattern for a face that forms a three-dimensional shape on the basis of the three-dimensional shape data 2 (step S2). For example, the computer determines the number (subdivision number) of parts into which each edge that forms the face is subdivided and determines a pattern (subdivision pattern) in accordance with which the face is subdivided according to a subdivision number for each edge.

The computer determines a curved face shape of the face on the basis of the position of the vertices of the face and the direction of normals at the vertices defined in advance in the three-dimensional shape data 2 (step S3). For example, the computer determines a curved face shape of the face so that a line perpendicular to a normal will be a tangent to the curved face shape. Typically, the direction of a normal is defined by a normal vector (unit vector).

Then the computer subdivides the determined curved face shape according to the determined subdivision pattern and generates a plurality of faces on the curved face shape (step S4). The computer displays a three-dimensional shape formed by the plurality of faces generated (step S5).

By making any computer execute this three-dimensional shape display program, a curved face shape corresponding to the direction of normals and the like defined for a face included in the three-dimensional shape data 2 is determined and is subdivided into a plurality of faces. A three-dimensional shape formed by the plurality of faces generated by the subdivision is displayed.

As a result, the three-dimensional shape defined by the original CAD data 1 can be recorded by the three-dimensional shape data 2 the amount of which is smaller than that of the CAD data 1. The shape defined by the CAD data 1 can be reproduced with a small error on the basis of the three-dimensional shape data 2.

Furthermore, the coordinates of the vertices of the face that forms the three-dimensional shape and the direction of normals at the vertices are set in the three-dimensional shape data 2. The direction of the normals is defined by, for example, a normal vector. This normal vector is information necessary for calculations for Gouraud shading, the reflection of light, and the like performed for the purpose of displaying a realistic screen. In the present invention, the direction of the normals is defined in the three-dimensional shape data 2. Therefore, by considering the three-dimensional shape data 2 itself as a polygon model, a realistic screen can be displayed directly (by using, for example, Gouraud shading). In this case, the computer judges from the existing state of things whether the face should be subdivided. As a result, a switch can be made properly between high-speed display in which the face is not subdivided and highly accurate display in which the face is subdivided.

Many of pieces of data compressed by the conventional subdivision method does not use information (normal vectors) indicative of the direction of a normal for subdividing a face. The same applies to the above invention disclosed in U.S. Pat. No. 6,222,553. Accordingly, even if normal vectors are included in the compressed data, they are data unnecessary for subdividing a face and the amount of the compressed data will increase.

Moreover, by determining the curved face shape by the direction of the normals, the amount of data necessary for reproducing the original three-dimensional shape can be restrained. That is to say, in most cases, two faces which are smoothly connected can share information (normal vector) for defining the direction of normals at the end points of the boundary edge. Therefore, the amount of the entire three-dimensional shape data 2 is reduced.

Furthermore, in the present invention, subdivision may be made according to faces defined in the three-dimensional shape data 2. As a result, by sequentially sending polygon data for a face subdivided to a three-dimensional display circuit, a three-dimensional shape can be displayed with great accuracy after the subdivision of the face. Accordingly, there is no need to hold all the data which defines a three-dimensional shape after the subdivision of a face in a main memory in the computer. That is to say, the amount of necessary memory space can be reduced.

In addition, when the subdivision pattern is determined, a subdivision number for each edge that forms a face is determined first and then the face is subdivided according to the subdivision number for each edge. This avoids unnecessary subdivision of the face. For example, by subdividing an edge defined by a curve into a plurality of parts without subdividing a straight edge, a face can be subdivided. This reduces the load caused by processing and enables a high-speed display process.

An embodiment of the present invention will now be described concretely. In the following embodiment, a face formed by three edges and a face formed by four edges may mingle in compressed three-dimensional shape data. Hereinafter data compressed into structure defined in the present invention will be referred to as hybrid mesh data.

The position of a vertex of a face which forms a three-dimensional shape is the end point of an edge which forms the face. Accordingly, in the following embodiment, the position of a vertex of a face will be referred to as an end point.

Figure 2:
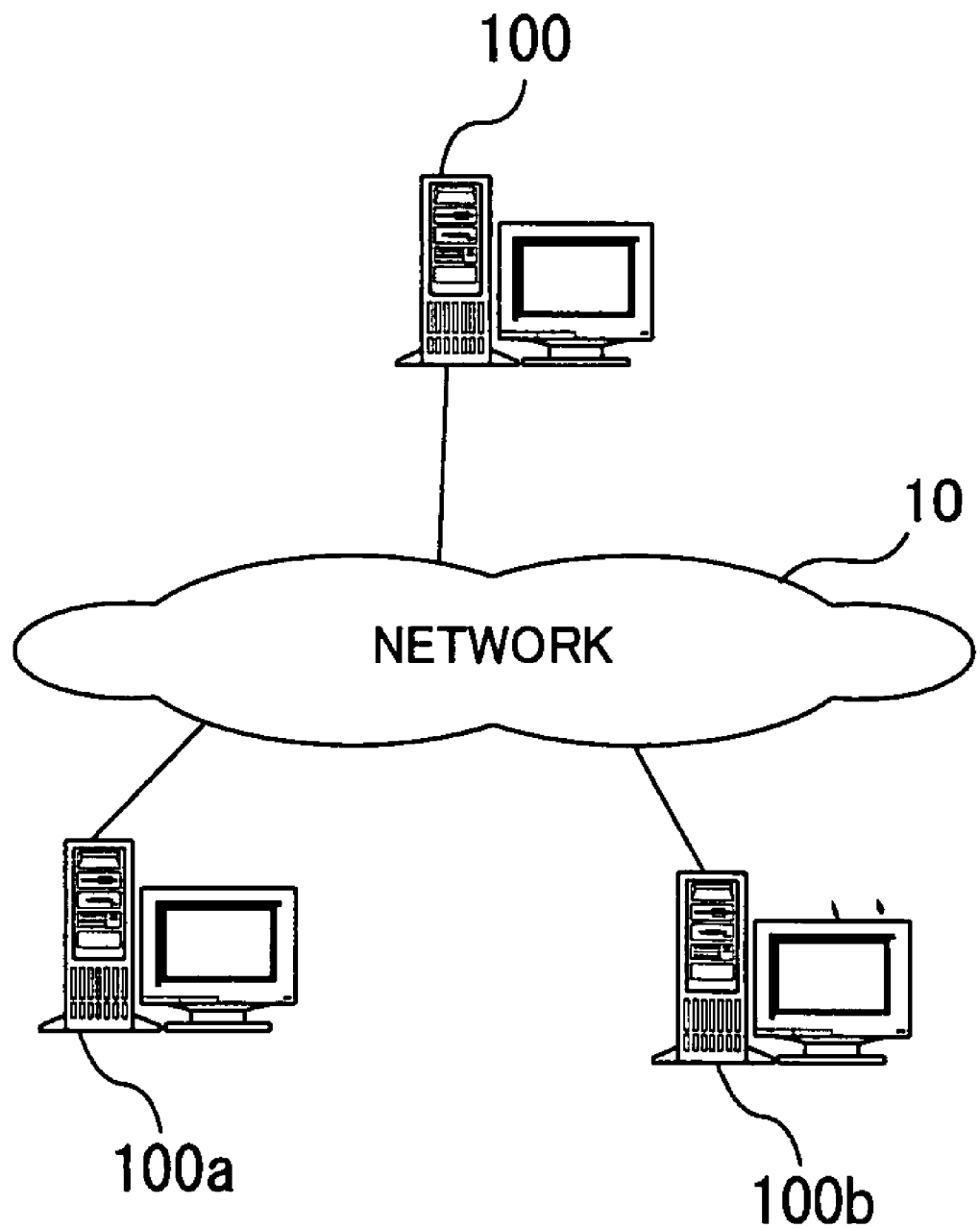
FIG. 2 shows the configuration of a system according to the embodiment of the present invention.

FIG. 2 shows the configuration of a system according to the embodiment of the present invention. As shown in FIG. 2, a plurality of computers 100, 100a, and 100b are connected to one another via a network 10. The network 10 is an in-house local area network (LAN), the Internet, or the like.

A three-dimensional CAD program is installed on each of the computers 100, 100a, and 100b and CAD data (solid model) for, for example, various parts can be generated by using the computers 100, 100a, and 100b. A viewer for three-dimensional CAD data generated in the present invention is installed on each of the computers 100, 100a, and 100b. When the viewer is executed on each of the computers 100, 100a, and 100b, CAD data is compressed at a high compression ratio and saved and a three-dimensional model is displayed on a screen on the basis of compressed data. Moreover, by exchanging compressed data among the computers 100, 100a, and 100b via the network 10, collaboration by CAD can be performed.

Figure 3:
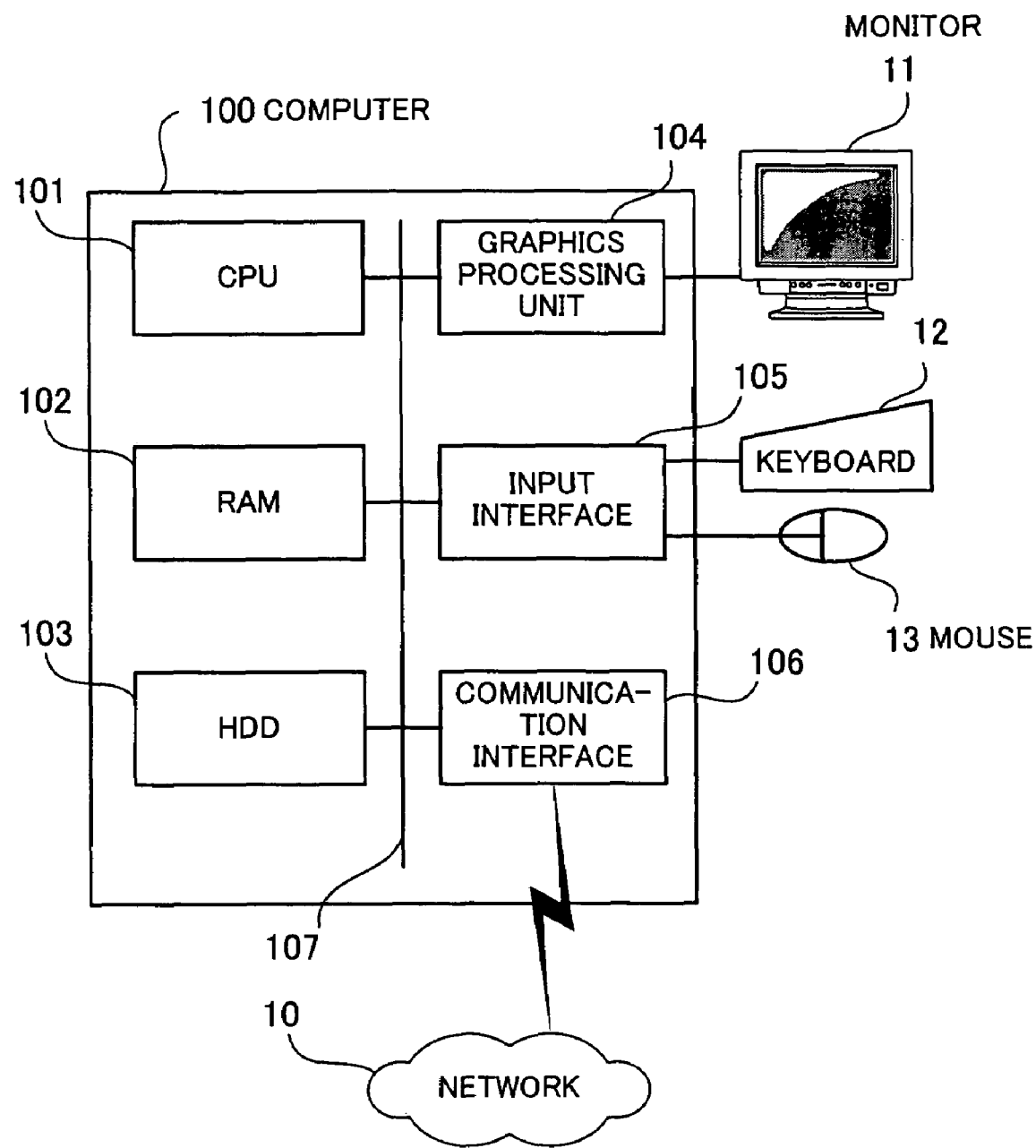
FIG. 3 shows an example of the hardware configuration of the computer used in the embodiment of the present invention.

The embodiment of the present invention in which the computer 100 is used will now be described in detail. FIG. 3 shows an example of the hardware configuration of the computer used in the embodiment of the present invention. The entire computer 100 is controlled by a CPU 101. A random access memory (RAM) 102, a hard disk drive (HDD) 103, a graphics processing unit 104, an input interface 105, and a communication interface 106 are connected to the CPU 101 via a bus 107.

The RAM 102 temporarily stores at least part of an operating system (OS) or an application program executed by the CPU 101. The RAM 102 also stores various pieces of data which the CPU 101 needs to perform a process. The HDD 103 stores the OS and application programs.

The graphics processing unit 104 includes a three-dimensional display circuit. A monitor 11 is connected to the graphics processing unit 104. In accordance with instructions from the CPU 101, the graphics processing unit 104 generates an image based on three-dimensional coordinate data (polygon data, for example) and displays it on the screen of the monitor 11. A keyboard 12 and a mouse 13 are connected to the input interface 105. The input interface 105 sends a signal sent from the keyboard 12 or the mouse 13 to the CPU 101 via the bus 107.

The communication interface 106 is connected to the network 10. The communication interface 106 exchanges data with another computer via the network 10.

A processing function in this embodiment can be performed by the above hardware configuration.

Figure 4:
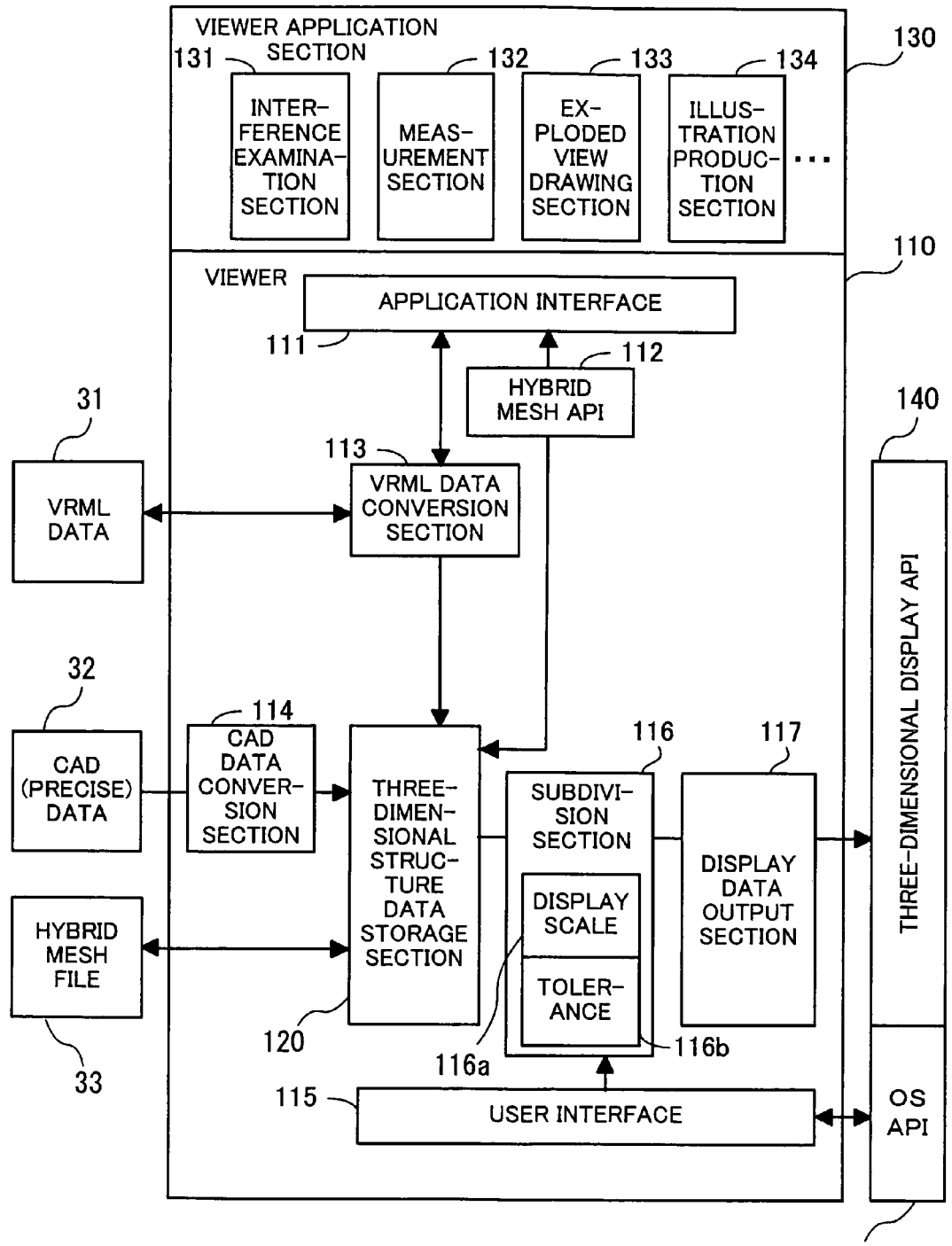
FIG. 4 is a functional block diagram showing the function of the embodiment of the present invention.

FIG. 4 is a functional block diagram showing the function of the embodiment of the present invention. The computer 100 includes a viewer 110, a viewer application section 130, a three-dimensional display application program interface (API) 140, and an OSAPI 150.

The viewer 110 converts the format of data indicative of a three-dimensional shape to compress the data. For example, the viewer 110 converts VRML data 31 or CAD data 32 into hybrid mesh data. Moreover, the viewer 110 reproduces a three-dimensional shape with a predetermined error on the basis of the hybrid mesh data. The three-dimensional shape reproduced is a polygon model formed by a plurality of polygons. The detailed structure of the viewer 110 will be described later.

The viewer application section 130 has an additional function for supporting design work by CAD in cooperation with the viewer 110. In this example, the viewer application section 130 includes an interference examination section 131, a measurement section 132, an exploded view drawing section 133, an illustration production section 134 and the like as the additional function. The interference examination section 131 determines on the basis of the three-dimensional shape data received from the viewer 110 whether there is interference between parts. The measurement section 132 calculates the distance between any two points on the basis of the three-dimensional shape data received from the viewer 110. The exploded view drawing section 133 draws an exploded view of the three-dimensional shape on the basis of the three-dimensional shape data received from the viewer 110. The illustration production section 134 produces an illustration image of the three-dimensional shape on the basis of the three-dimensional shape data received from the viewer 110.

The three-dimensional display API 140 is an interface between the various processing functions of the viewer 110 etc. and the graphics processing unit 104 for three-dimensional display. To be concrete, the three-dimensional display API 140 generates a request for a three-dimensional display process on the basis of information regarding polygons and the like received from the viewer 110 and makes the computer 100 execute the request for a three-dimensional display process. For example, the three-dimensional display API 140 sends information, such as the coordinates of end points on the polygons and the color of the polygons, received from the viewer 110 to the graphics processing unit 104 shown in FIG. 3, together with a display instruction. Then the graphics processing unit 104 sees through and performs the projection of each polygon and produces an image (frame image) indicative of a three-dimensional shape formed by a plurality of polygons. Data for the image produced by the graphics processing unit 104 is sent to the monitor 11 in a predetermined cycle and the image indicative of the three-dimensional shape is displayed on the screen of the monitor 11. OpenGL (trademark) or the like can be used as the three-dimensional display API 140.

The OSAPI 150 is an interface between the OS and other processing functions. To be concrete, the OSAPI 150 starts a processing function of the OS corresponding to a request for a process outputted from, for example, the viewer 110 and makes the computer 100 perform the process.

The structure of the viewer 110 will now be described.

The viewer 110 includes an application interface 111, a hybrid mesh API 112, a VRML data conversion section 113, a CAD data conversion section 114, a user interface 115, a subdivision section 116, a display data output section 117, and a three-dimensional structure data storage section 120.

The application interface 111 is an interface between the viewer application section 130 and the viewer 110. To be concrete, the application interface 111 sends three-dimensional structure data (mock-up data) it receives via the hybrid mesh API 112 to, for example, the interference examination section 131 in the viewer application section 130. Moreover, the application interface 111 sends three-dimensional structure data that it receives from, for example, the interference examination section 131 in the viewer application section 130 to the hybrid mesh API 112.

The hybrid mesh API 112 is an interface for providing an environment in which access to the three-dimensional structure data storage section 120 is gained to the application interface 111. To be concrete, the hybrid mesh API 112 sends part (or all) of hybrid mesh data stored in the three-dimensional structure data storage section 120 to the application interface 111 in response to a request made via the application interface 111. Moreover, the hybrid mesh API 112 stores data that it receives via the application interface 111 in the three-dimensional structure data storage section 120 as part (or all) of the hybrid mesh data.

The VRML data conversion section 113 converts the VRML data 31 into hybrid mesh data. This reduces the amount of data indicative of a three-dimensional shape. The VRML data conversion section 113 stores the hybrid mesh data in the three-dimensional structure data storage section 120.

The CAD data conversion section 114 converts the CAD data 32 into hybrid mesh data. This reduces the amount of data indicative of a three-dimensional shape. The CAD data conversion section 114 stores the hybrid mesh data in the three-dimensional structure data storage section 120.

The user interface 115 obtains information provided by input operation with the keyboard 12 or the mouse 13 in cooperation with the OSAPI 150. In response to the input operation, the user interface 115 issues a request for a process to each component in the viewer 110 or sends data to each component in the viewer 110. For example, the user interface 115 sends a display scale 116a or tolerance 116b designated by the input operation to the subdivision section 116. Moreover, when instructions to change the relative position of a three-dimensional shape and a viewpoint for projecting an object to be displayed are inputted (when the three-dimensional shape moves on a display screen), the user interface 115 informs the subdivision section 116 that the three-dimensional shape is moving.

The subdivision section 116 subdivides hybrid mesh data. That is to say, the subdivision section 116 subdivides each face included in the hybrid mesh data the structure of which is represented more coarsely than that of the CAD data 32 to obtain a shape similar to the one which is defined by the original CAD data 32. Each time the subdivision section 116 subdivides a face, the subdivision section 116 sends information regarding faces made by the subdivision to the display data output section 117.

The subdivision section 116 holds the display scale 116a and the tolerance 116b as parameters for determining a subdivision number for each face included in the hybrid mesh data. The display scale 116a is a scale on which a three-dimensional shape defined by the hybrid mesh data is displayed on the screen. The tolerance 116b is the maximum value of a shape error which occurs when a three-dimensional shape (shape formed by curved faces) defined on the basis of the hybrid mesh data is displayed by using plane polygons. When the display scale 116a is high, the subdivision section 116 increases subdivision numbers for polygons. When the display scale 116a is low, the subdivision section 116 decreases subdivision numbers for polygons. Furthermore, when the tolerance 116b is great, the subdivision section 116 decreases subdivision numbers for polygons. When the tolerance 116b is small, the subdivision section 116 increases subdivision numbers for polygons.

The display data output section 117 outputs information regarding the polygons made by the subdivision section 116 to the three-dimensional display API 140.

The three-dimensional structure data storage section 120 is a storage area in the RAM 102 for storing data regarding the three-dimensional structure (combination of the three-dimensional shapes of the parts) of a model (automobile, for example) to be displayed. This data consists mainly of hybrid mesh data indicative of the three-dimensional shape of each component in the model (each part in an automobile, for example) to be displayed. This hybrid mesh data is generated by the VRML data conversion section 113 or the CAD data conversion section 114. In some cases, this hybrid mesh data is read from a hybrid mesh file 33 in the HDD 103.

Information regarding the shape of each face that forms a three-dimensional shape is defined in the hybrid mesh data. Information for each face is considered as a polygon, is sent to the three-dimensional display API 140 in its original condition, and is displayed on the screen. The hybrid mesh data also includes information (such as base subdivision numbers) necessary for subdividing each face.

The structure of data in the three-dimensional structure data storage section 120 will now be described in detail.

Figure 5:
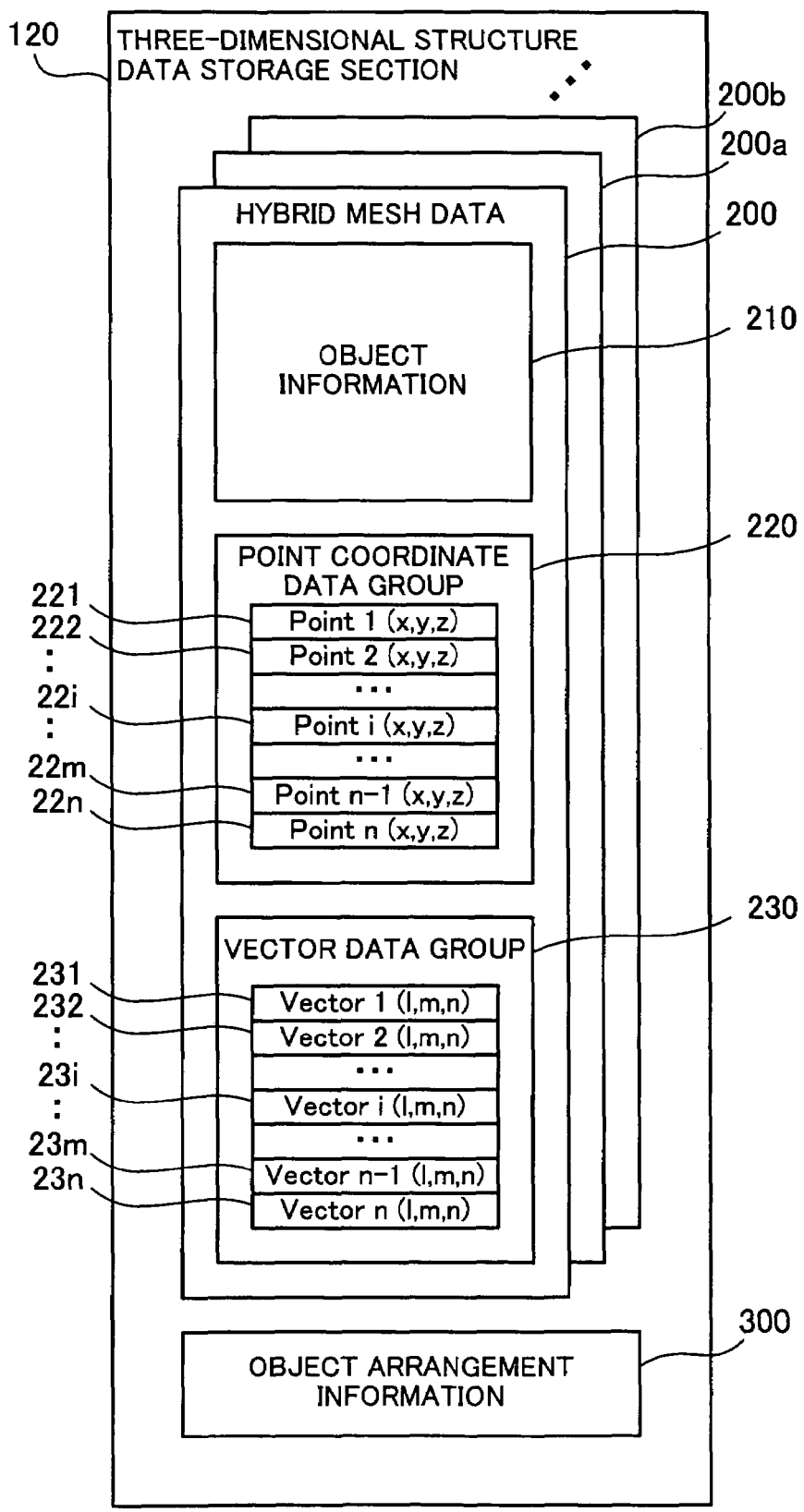
FIG. 5 shows the internal structure of a three-dimensional structure data storage section.

FIG. 5 shows the internal structure of the three-dimensional structure data storage section. The three-dimensional structure data storage section 120 stores a plurality of pieces of hybrid mesh data 200, 200a, 200b, etc. and object arrangement information 300. The plurality of pieces of hybrid mesh data 200, 200a, 200b, etc. define the shape of each part (object) in a model to be displayed. The plurality of pieces of hybrid mesh data 200, 200a, 200b, etc. may be grouped according to units in the model to be displayed. Each unit consists of one or more parts. If an object to be displayed is an assembly, then a subassembly corresponds to a unit. For example, if an object to be displayed is an automobile, then an engine, a suspension, or the like corresponds to a unit. One unit may consist of a plurality of units (each unit includes one or more parts).

The hybrid mesh data 200 includes object information 210, a point coordinate data group 220, and a vector data group 230. The object information 210 is data indicative of the three-dimensional shape and color, for example, of each part. The details of the object information 210 will be described later.

The point coordinate data group 220 is a set of end point coordinate data 221, 222, . . . , 22i, . . . , 22m, 22n for end points on faces that form three-dimensional shapes. x, y, and z coordinates in a three-dimensional space (local coordinate system) represented by the x-axis, y-axis, and z-axis are set as the end point coordinate data 221, 222, . . . , 22i, . . . , 22m, 22n.

The vector data group 230 is a set of vector data 231, 232, . . . , 23i, . . . , 23m, 23n indicative of normal vectors or tangent vectors defined at the end points on the faces that form the three-dimensional shapes. The vector data 231, 232, . . . , 23i, . . . , 23m, 23n indicate the directions and magnitudes of the normal vectors or tangent vectors in the three-dimensional space (local coordinate system) by vector components in the x-axis, y-axis, and z-axis directions.

In this embodiment, all the vectors designated as normal vectors are unit vectors with a length of one. Not all the vectors designated as tangent vectors are unit vectors.

The object arrangement information 300 defines the position and direction of the three-dimensional shapes arranged in a global coordinate system (World Coordinate System). Arrangement information for each three-dimensional shape is defined. As a result, each part in an object to be displayed can be arranged in the global coordinate system and the shape of an object to be displayed which consists of a combination of a plurality of three-dimensional shapes can be formed.

The contents of the object information will now be described in detail.

Figure 6:
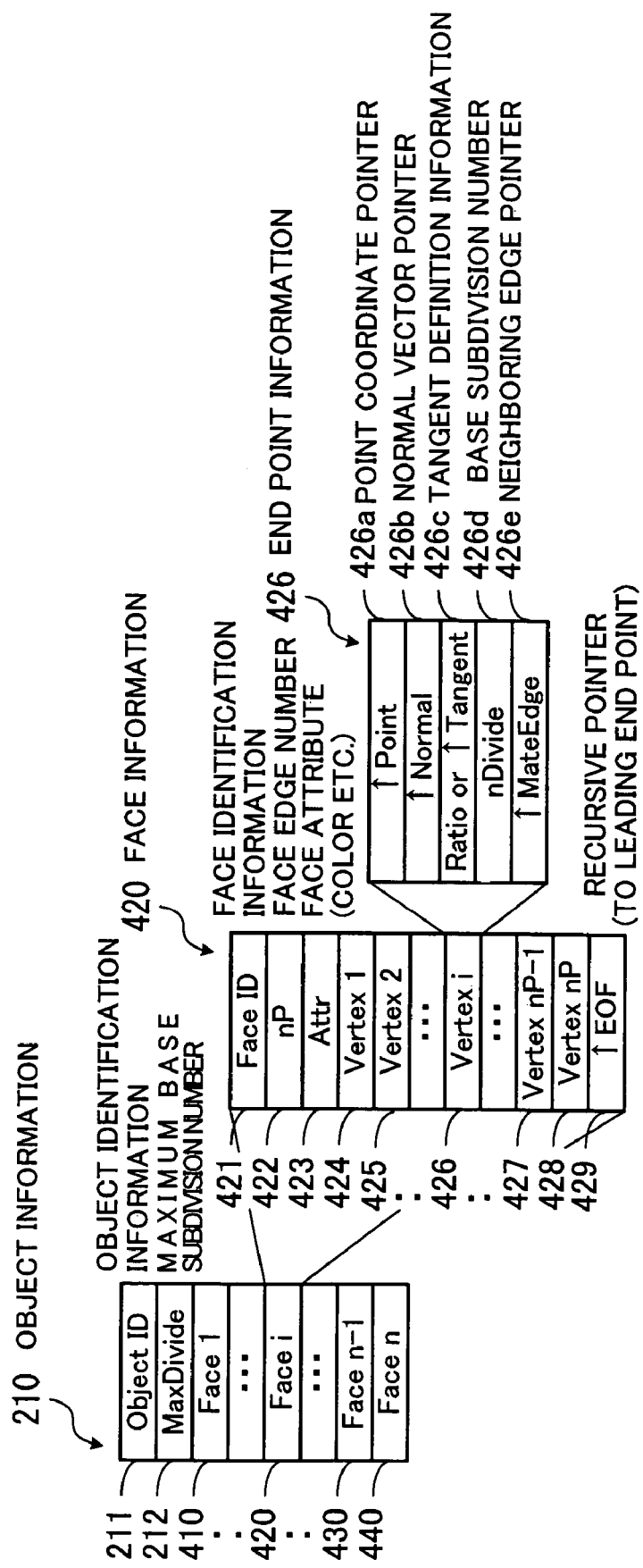
FIG. 6 shows an example of the data structure of object information.

FIG. 6 shows an example of the data structure of the object information. In FIG. 6, an arrow (t) before a data name indicates that the data is a pointer which points to the location where another piece of data is stored.

The object information 210 includes object identification information (Object ID) 211, a maximum base subdivision number (MaxDivide) 212, and a plurality of pieces of face information (Face 1, . . . , Face i, . . . , Face n−1, Face n) 410, 420, 430, and 440. The object identification information 211 is used for uniquely identifying the object information 210 generated according to parts in an object to be displayed. The maximum base subdivision number 212 is the greatest value of base subdivision numbers set for the edges of a face included in the object information 210. The plurality of pieces of face information 410, 420, 430, and 440 are information regarding faces that form each part.

The face information 420 includes face identification information (Face ID) 421, a face edge number (nP) 422, a face attribute (Attr) 423, a plurality of pieces of end point information (Vertex 1, Vertex 2, . . . , Vertex i, . . . , Vertex nP−1, Vertex nP) 424, 425, 426, 427, and 428, and a recursive pointer (↑ EOF) 429. The face identification information 421 is used for uniquely identifying face information included in the object information 210. The face edge number 422 is the number of edges (straight line or curve) that form a face. The face attribute 423 is attribute information, such as the color of the face.

The plurality of pieces of end point information 424, 425, 426, 427, and 428 are information regarding end points on the face. The recursive pointer 429 is a pointer that points to the location of the leading end point information 424. The recursive pointer 429 points to the leading end point information 424, so the end point information 424, 425, 426, 427, and 428 forms a loop in the order in which the end points are arranged. An edge that forms the face is defined by two successive pieces of end point information. In this case, the final end point information 428 and the leading end point information 424 are considered to be successive.

The endpoint information 426 includes a point coordinate pointer (↑ Point) 426a, a normal vector pointer (↑ Normal) 426b, tangent definition information (Ratio or Tangent) 426c, a base subdivision number (nDivide) 426d, and a neighboring edge pointer (↑ MateEdge) 426e.

The point coordinate pointer 426a points to point coordinate data indicative of the location in a three-dimensional space (local coordinate system) of the end point from among the end point coordinate data 221, 222, . . . , 22i, . . . , 22m, 22n included in the point coordinate data group 220. The normal vector pointer 426b points to vector data indicative of the value of a normal vector at the end point from among the vector data 231, 232, . . . , 23i, . . . , 23m, 23n included in the vector data group 230.

The tangent definition information 426c is used for defining a tangent vector at the end point. The length (Ratio) of a tangent at the end point or a pointer (Tangent) that points to the tangent vector at the end point is set as the tangent definition information 426c. If the direction of the tangent vector can be determined from the normal vector and the location of both end points on the edge (if the edge curves in the direction indicated by the normal vector), then the length of a tangent is set as the tangent definition information 426c. If the direction of the tangent vector cannot be determined from the normal vector and the location of both end points on the edge (if the edge curves in a direction different from that indicated by the normal vector), then a pointer that points to the tangent vector at the end point is set as the tangent definition information 426c.

The base subdivision number 426d is a preset subdivision number for the edge. The value of the base subdivision number 426d is set so that on a display scale of 1 (neither magnification nor reduction is performed) an error which occurs after the subdivision will be within a predetermined range.

If the face shares an edge with a neighboring face, the neighboring edge pointer 426e points to information (the leading position of two pieces of end point information indicative of both ends of an edge) regarding the edge the neighboring face share. The sharing relationship of an edge between faces in a loop formed by connecting the neighboring faces is defined by the neighboring edge pointer 426e.

If point coordinate pointers included in end point information for a plurality of edges point to the same address (location of the same point coordinate data), then an end point on each edge is shared.

If end points on a plurality of edges are shared and normal vector pointers included in end point information for the end points on the plurality of edges point to the same address (location of the same normal vector data), then a normal vector for each edge is shared.

As stated above, in the hybrid mesh data 200, 200a, and 200b in this embodiment, loops formed by end points, loops formed by faces, the sharing relationships of end points on edges, the sharing relationships of normal vectors, and the sharing relationships of edges are defined. As a result, information regarding the topology and geometry of three-dimensional shapes is defined. The topology indicates how the boundaries, such as the faces, edges, and end points (vertices), of a solid are interconnected. The geometry indicates the actual shape, such as the curved faces, curves, and points, of the solid.

A concrete example of the object information 210 for a three-dimensional shape will now be described with reference to FIGS. 7 and 8.

Figure 7A:
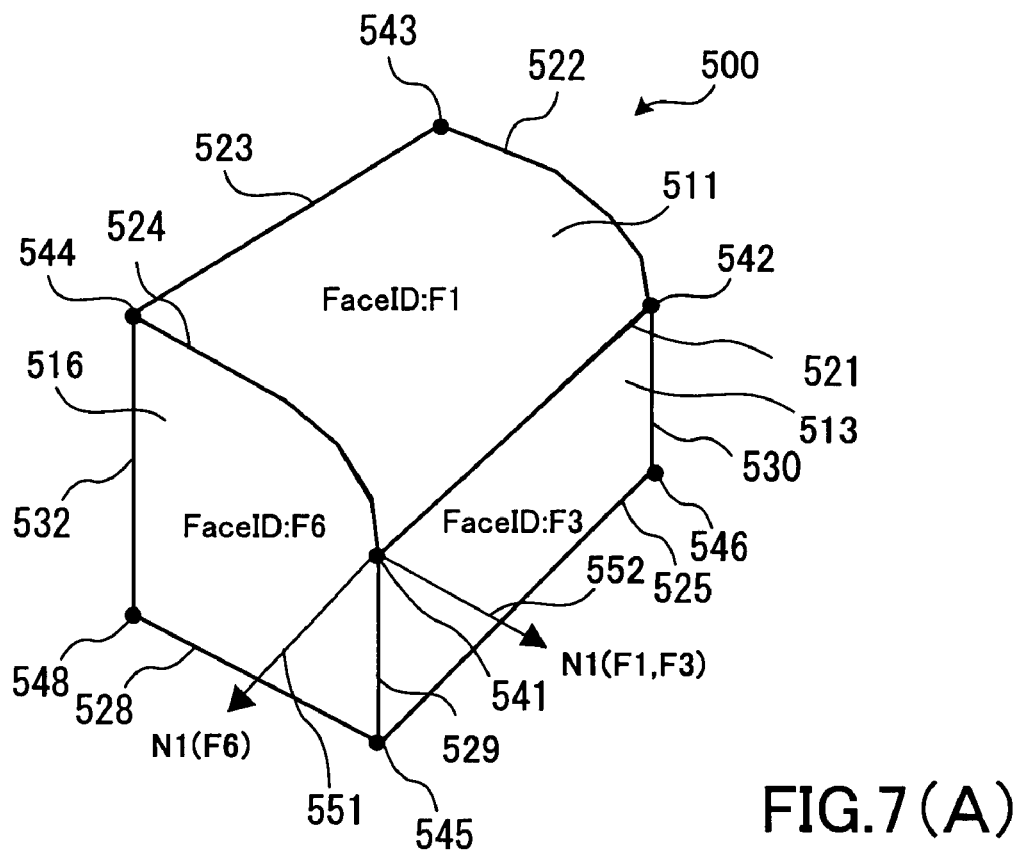
FIGS. 7(A) and 7(B) show an example of a three-dimensional shape, FIGS. 7(A) and 7(B) being perspective views of the three-dimensional shape.
Figure 7B:
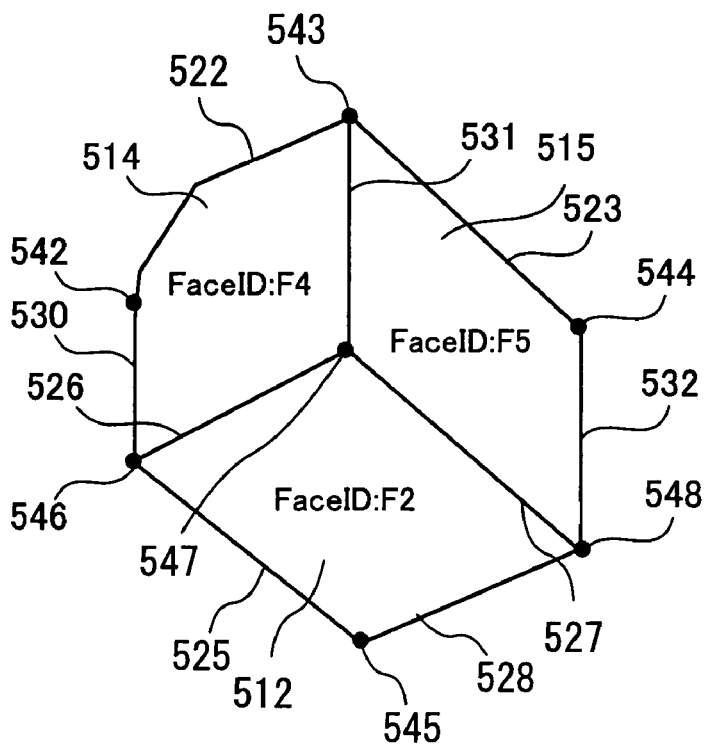

FIGS. 7(A) and 7(B) show an example of a three-dimensional shape. FIGS. 7(A) and 7(B) are perspective views of the three-dimensional shape. In FIGS. 7(A) and 7(B), the three-dimensional shape is seen from opposite directions.

A three-dimensional shape 500 is formed by six faces 511 through 516 and has twelve edges 521 through 532 and eight end points 541 through 548. Face identification information (Face ID) for the faces 511 through 516 are F1 through F6 respectively. The face 511 is a curved face and the other faces 512 through 516 are plane faces.

It is assumed that pointers (point coordinate pointers) to point coordinate data indicative of the location of the end points 541 through 548 are P1 through P8 respectively and that pointers (normal vector pointers) to vector data indicative of normal vectors at the end points 541 through 548 are N1 through N8 respectively. As shown in FIG. 7, two normal vectors 551 and 552 exist at the end point 541. In this case, face identification information for a face having the normal vector 551 or 552 is given in parentheses after a symbol indicative of normal vector data. That is to say, a normal vector pointer to the normal vector 551 the face 516 has is N1 (F6) and a normal vector pointer to the normal vector 552 shared by the faces 511 and 513 is N1(F1, F3).

An example of object information for the three-dimensional shape 500 having the above structure is as follows.

Figure 8:
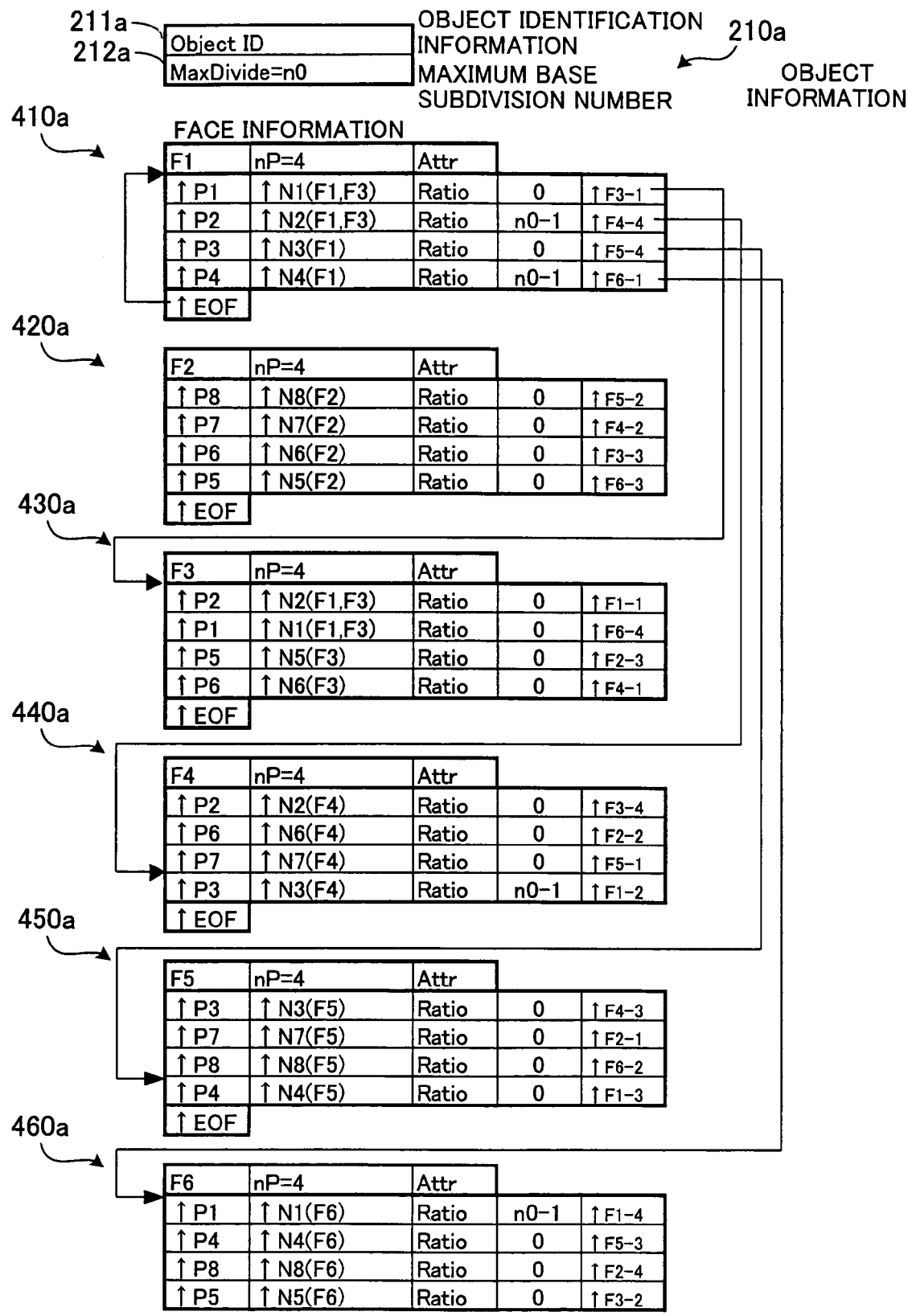
FIG. 8 shows a concrete example of object information.

FIG. 8 shows a concrete example of object information. Object information 210a includes object identification information 211a, a maximum base subdivision number 212a, and a plurality of pieces of face information 410a, 420a, 430a, 440a, 450a, and 460a. The face information 410a is information regarding the face 511 to which the face identification information "F1" is assigned. The face information 420a is information regarding the face 512 to which the face identification information "F2" is assigned. The face information 430a is information regarding the face 513 to which the face identification information "F3" is assigned. The face information 440a is information regarding the face 514 to which the face identification information "F4" is assigned. The face information 450a is information regarding the face 515 to which the face identification information "F5" is assigned. The face information 460a is information regarding the face 516 to which the face identification information "F6" is assigned.

A detailed description will now be given with the face information 410a as an example. Face identification information (Face ID) included in the face information 410a is "F1". This indicates that the face information 410a is information regarding the face 511 shown in FIG. 7. A face edge number (nP) included in the face information 410a is "4". This indicates that the face 511 is formed by four edges. Color information and the like are set as a face attribute (Attr) included in the face information 410a.

Endpoint information for the four endpoints 541 through 544 is included in the face information 410a. In this example, end point information for the end point 541 includes the point coordinate pointer "P1," the normal vector pointer "N1 (F1, F3)," the length of a tangent (Ratio), the base subdivision number "0," and a neighboring edge pointer that points to the leading end point information (F3-1) for the face 513 (face identification information "F3"). End point information for the end point 542 includes the point coordinate pointer "P2," the normal vector pointer "N2 (F1, F3)," the length of a tangent (Ratio), the base subdivision number "n0-1," and a neighboring edge pointer that points to the fourth end point information (F4-4) for the face 514 (face identification information "F4"). End point information for the end point 543 includes the point coordinate pointer "P3," the normal vector pointer "N3(F1)," the length of a tangent (Ratio), the base subdivision number "0," and a neighboring edge pointer that points to the fourth end point information (F5-4) for the face 515 (face identification information "F5"). End point information for the end point 544 includes the point coordinate pointer "P4," the normal vector pointer "N4(F1)," the length of a tangent (Ratio), the base subdivision number "n0-1," and a neighboring edge pointer that points to the leading end point information (F6-1) for the face 516 (face identification information "F6"). A recursive pointer points to the leading endpoint information.

A three-dimensional shape is displayed by the computer 100 having the above function, structure, and data structure. A method for displaying a three-dimensional shape will now be described in detail.

Figure 9:
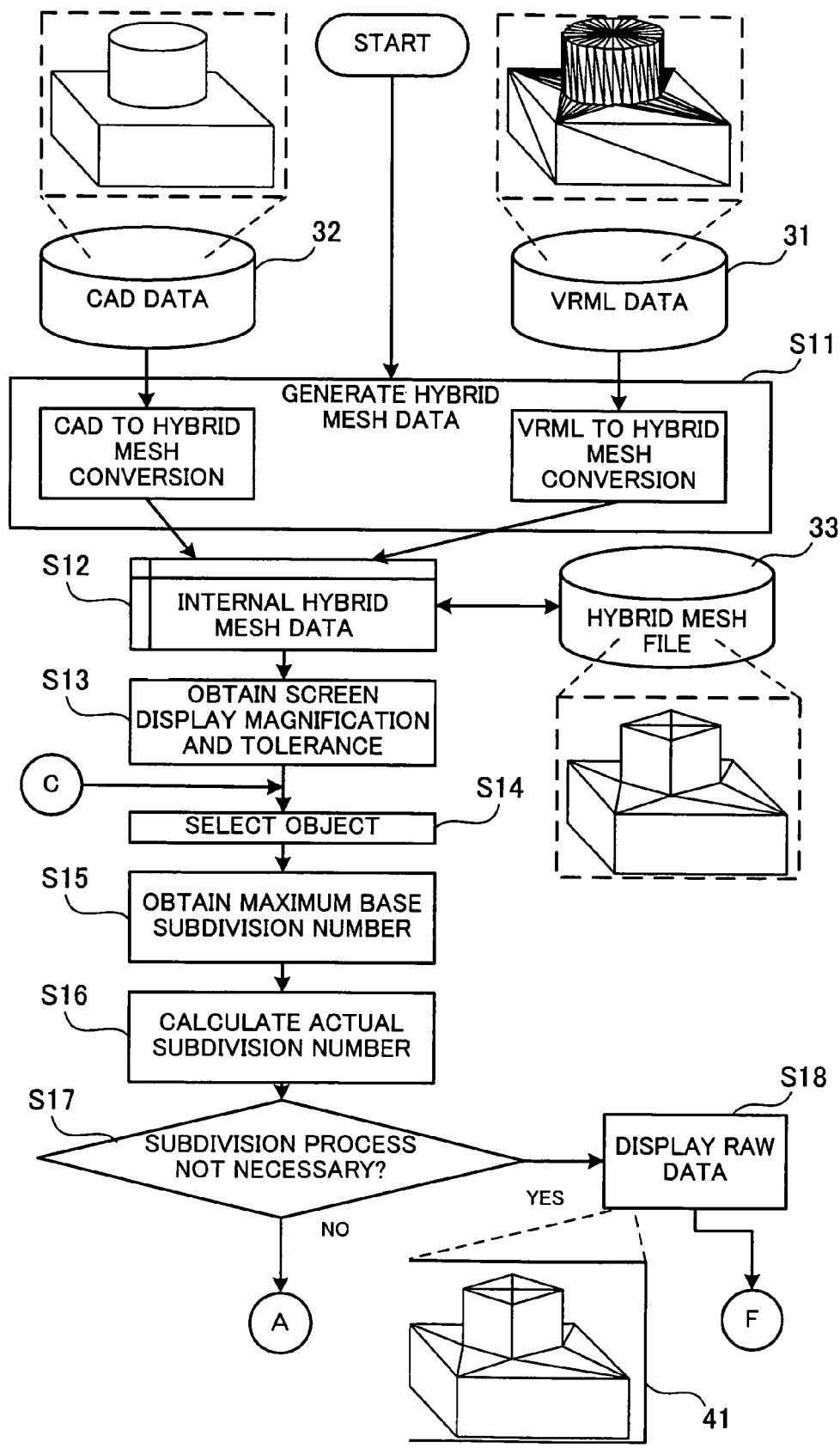
FIG. 9 is a first flow chart showing a procedure for displaying a three-dimensional shape.

FIG. 9 is a first flow chart showing a procedure for displaying a three-dimensional shape. The process shown in FIG. 9 will now be described in order of step number.

[Step S11] The computer 100 generates three-dimensional shape data which consists of hybrid mesh data in accordance with a user's instructions given by his/her input operation. For example, the VRML data conversion section 113 may analyze the three-dimensional shape of each part defined in the VRML data 31 and convert three-dimensional shape data for each part into the hybrid mesh data. The CAD data conversion section 114 may analyze the three-dimensional shape of each part defined in the CAD data 32 and convert three-dimensional shape data for each part into the hybrid mesh data.

The number of faces which form a three-dimensional shape defined in the generated hybrid mesh data is smaller than that of the faces which form the three-dimensional shape defined in the original VRML data 31. Therefore, data compression is performed (that is to say, the amount of the data reduces) as a result of the conversion process.

[Step S12] The VRML data conversion section 113 or the CAD data conversion section 114 stores the hybrid mesh data generated by the data conversion in the three-dimensional structure data storage section 120 in the RAM 102. The hybrid mesh data stored in the RAM 102 can be written to the hybrid mesh file 33. Moreover, hybrid mesh data read from the hybrid mesh file 33 can be stored in the three-dimensional structure data storage section 120 in the RAM 102.

[Step S13] The user interface 115 obtains a screen display scale and tolerance in response to input operation performed by the user with, for example, the keyboard 12. Then the user interface 115 sends the display scale and tolerance to the subdivision section 116.

[Step S14] The subdivision section 116 selects one of objects stored in the three-dimensional structure data storage section 120. Steps S15 through S37 will be performed on the selected object.

[Step S15] The subdivision section 116 retrieves hybrid mesh data for the object it selected in step S14 from the three-dimensional structure data storage section 120 and obtains a maximum base subdivision number.

[Step S16] The subdivision section 116 calculates an actual subdivision number on the basis of the screen display scale, the tolerance, and the maximum base subdivision number. The details of a method for calculating the actual subdivision number will be described later.

[Step S17] The subdivision section 116 determines whether a subdivision process is necessary. To be concrete, the subdivision section 116 determines whether the actual subdivision number calculated in step S16 is smaller than or equal to one. If the actual subdivision number is smaller than or equal to one, then the subdivision section 116 determines that a subdivision process is not necessary. If the actual subdivision number is greater than one, then the subdivision section 116 determines that a subdivision process is necessary.

The maximum base subdivision number is abase subdivision number for an edge for which a subdivision number is the greatest on the unit scale with the unit error. Therefore, if the subdivision of this edge is unnecessary, then the subdivision of the other edges is also unnecessary.

If a subdivision process is not necessary, then step S18 is performed. If a subdivision process is necessary, then step S21 shown in FIG. 10 is performed.

[Step S18] The subdivision section 116 sends the hybrid mesh data and object arrangement information stored in the three-dimensional structure data storage section 120 to the display data output section 117 in their original condition. The display data output section 117 outputs the hybrid mesh data to the three-dimensional display API 140. That is to say, the hybrid mesh data can directly be interpreted as polygon model data. Therefore, by outputting the hybrid mesh data to the three-dimensional display API 140 in the original data format, a three-dimensional shape 41 formed by a small number of faces (the number of the faces is defined in the hybrid mesh data) is displayed on the screen of the monitor 11. Then step S38 is performed.

As a result, if a display scale is low (if a small three-dimensional shape is displayed on the screen), the three-dimensional shape has a simple structure and can be displayed at a high speed. If tolerance is great, a three-dimensional shape having a simple structure can also be displayed on the screen at a high speed.

Figure 10:
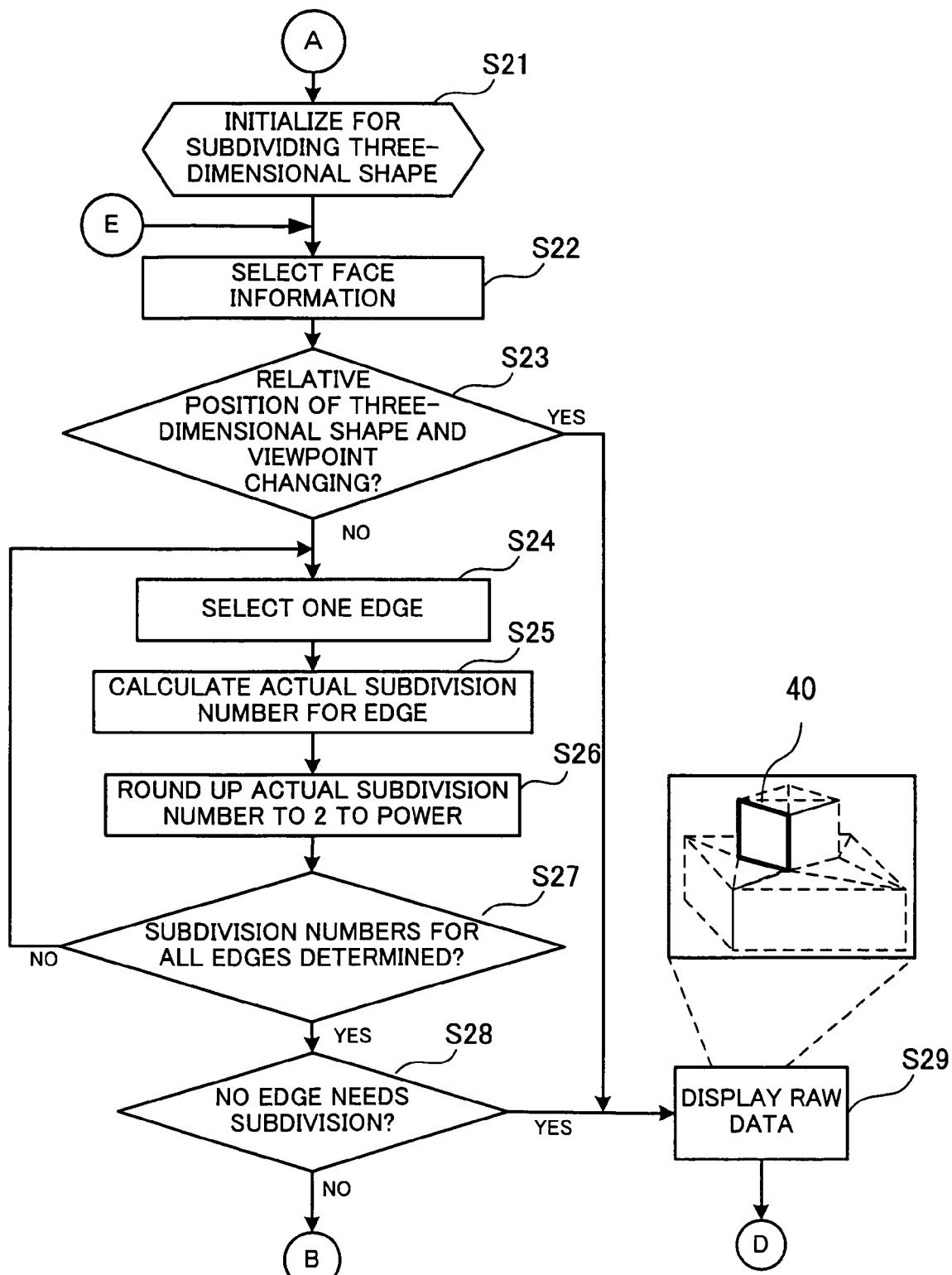
FIG. 10 is a second flow chart showing the procedure for displaying a three-dimensional shape.

FIG. 10 is a second flow chart showing the procedure for displaying a three-dimensional shape. The process shown in FIG. 10 will now be described in order of step number.

[Step S21] The subdivision section 116 initializes parameters and the like necessary for subdividing the three-dimensional shape.

[Step S22] The subdivision section 116 selects a piece of face information from among the hybrid mesh data stored in the three-dimensional structure data storage section 120.

[Step S23] The subdivision section 116 determines whether the relative position of a viewpoint (virtual camera) and the three-dimensional shape (the face selected in step S22) is changing. That is to say, the subdivision section 116 determines whether the three-dimensional shape is moving on the display screen. If the relative position of the three-dimensional shape and the viewpoint is changing, then step S29 is performed. If the relative position of the three-dimensional shape and the viewpoint is not changing, then step S24 is performed. In this embodiment, the relative position of the three-dimensional shape and the viewpoint will change in response to input operation (in accordance with instructions to shift the viewpoint, instructions to change the direction of the viewpoint (visual axis), or the like) by the user.

[Step S24] The subdivision section 116 selects one of edges (from a column of pieces of end point information) defined in the selected face information.

[Step S25] The subdivision section 116 calculates an actual subdivision number for the selected edge. This actual subdivision number is obtained by multiplying the base subdivision number n0 for the selected edge by the value $\sqrt{(Scale/Tol)}$ common to all of the three-dimensional shapes displayed on one screen.

[Step S26] The subdivision section 116 rounds up the actual subdivision number calculated in step S25 to 2 to a power. By making a subdivision number for the edge 2 to the power, the subdivision of a triangular polygon can be made according to a simple subdivision pattern.

[Step S27] The subdivision section 116 checks whether subdivision numbers for all of the edges defined in the face information selected in step S22 are determined. If subdivision numbers for all of the edges defined in the face information selected in step S22 are determined, then step S28 is performed. If there is an edge still to be dealt with, then step S24 is performed.

[Step S28] The subdivision section 116 determines whether no edge needs subdivision (whether the subdivision numbers for all of the edges are smaller than or equal to one). If no edge needs subdivision, then step S29 is performed. If there is an edge that needs subdivision, then step S31 shown in FIG. 11 is performed.

[Step S29] The subdivision section 116 sends the face information selected in step S22 from among the hybrid mesh data stored in the three-dimensional structure data storage section 120 to the display data output section 117 in its original condition. The display data output section 117 outputs the face information to the three-dimensional display API 140. Then a face 40 selected in step S22 is displayed on the monitor 11 without being subdivided. After that, step 37 shown in FIG. 11 is performed.

As stated above, if a three-dimensional shape is moving on the screen, each face is displayed on the screen without being subdivided. As a result, the three-dimensional shape formed by a small number of faces (the number of the faces defined in the hybrid mesh data) is displayed on the screen of the monitor 11. That is to say, by reducing the amount of the process, the three-dimensional shape can be displayed on the screen at a high speed.

Figure 11:
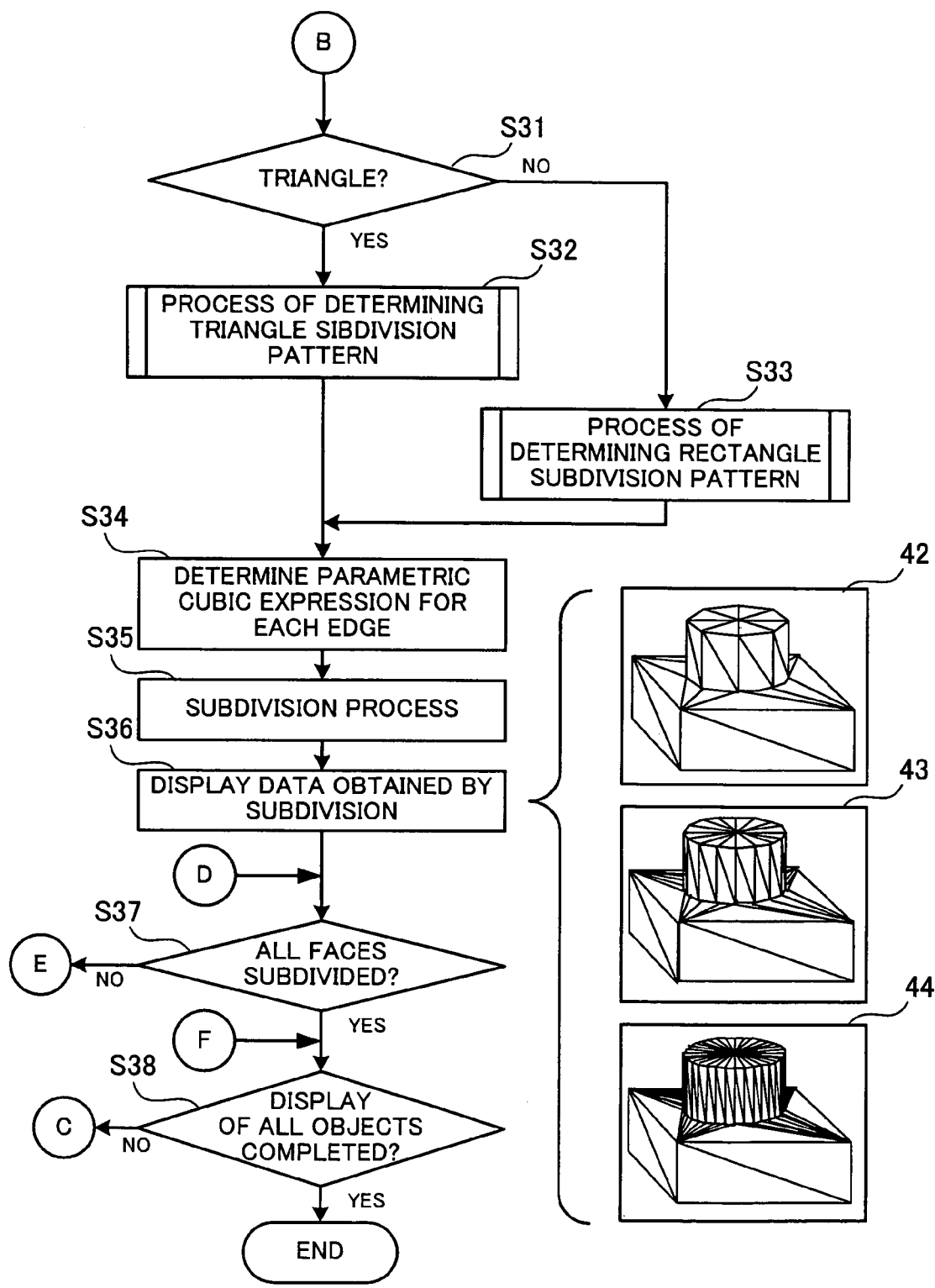
FIG. 11 is a third flow chart showing the procedure for displaying a three-dimensional shape.

FIG. 11 is a third flow chart showing the procedure for displaying a three-dimensional shape. The process shown in FIG. 11 will now be described in order of step number.

[Step S31] The subdivision section 116 determines whether the face information selected in step S22 shown in FIG. 10 indicates a triangle (triangle patch, three-edge-shape, hereinafter, "triangle") or a rectangle (rectangular patch, four-edge-shape, hereinafter "rectangle"). If the face information selected in step S22 shown in FIG. 10 indicates a triangle, then step S32 is performed. If the face information selected in step S22 shown in FIG. 10 indicates a rectangle, then step S33 is performed.

[Step S32] The subdivision section 116 performs the process of determining a triangle subdivision pattern. This process is performed for determining a subdivision pattern for the triangle at the first stage according to an actual subdivision number for each edge. That is to say, the process of subdividing the triangle is performed through many stages. In step S32, a subdivision pattern at the first stage is determined. The details of the process of subdividing the triangle will be described later. Then step S34 is performed.

[Step S33] The subdivision section 116 performs the process of determining a rectangle subdivision pattern. This process is performed for determining a subdivision pattern for the rectangle at the first stage according to an actual subdivision number for each edge. That is to say, the process of subdividing the rectangle is performed through many stages. In step S33, a subdivision pattern at the first stage is determined. The details of this process will be described later.

[Step S34] The subdivision section 116 determines a parametric cubic expression for each edge.

[Step S35] The subdivision section 116 subdivides each of the faces that form the three-dimensional shape according to the subdivision pattern determined in step S32 or S33 and the parametric cubic expression determined in step S34. If each face cannot be subdivided further, then step S36 is performed.

If each face can be subdivided further, the subdivision section 116 recursively performs the process of steps S31 through S36. In this case, the subdivision section 116 performs the process of determining a subdivision pattern at the second stage of the many stages through which the subdivision process is performed. By recursively performing the process of steps S31 through S36 in this way, the face selected in step S22 is subdivided gradually.

[Step S36] The subdivision section 116 sends three-dimensional shape data obtained by the subdivision to the display data output section 117. The display data output section 117 outputs the three-dimensional shape data to the three-dimensional display API 140. As a result, three-dimensional shapes 42 through 44 are displayed on the screen of the monitor 11 with accuracy corresponding to subdivision numbers.

Step S36 is performed when the selected face has reached a state in which it cannot be subdivided further. Each time the smallest unit of the triangle is generated, polygon data for displaying the triangle is sent to the display data output section 117. Therefore, the subdivision section 116 need not hold polygon data for the entire three-dimensional shape.

[Step S37] The subdivision section 116 checks whether all of the faces are subdivided. If all of the faces are subdivided, then step S38 is performed. If there is a face that is not yet subdivided, then step S22 is performed.

[Step S38] The subdivision section 116 checks whether the display of all of the objects on the screen is completed. When instructions to terminate the viewer 110 is given by the user's input operation, the subdivision section 116 also determines that the display on the screen is completed. If the display on the screen is completed, the process terminates. If the hybrid mesh data for another object is displayed on the screen, then step S14 shown in FIG. 9 is performed.

As stated above, a three-dimensional shape is displayed on the screen with accuracy according to a display scale, tolerance, and the relative position of the three-dimensional shape and a viewpoint. In addition, a three-dimensional shape can be displayed with great accuracy (with a small error) on the basis of hybrid mesh data in which the shape of faces is roughly defined. Therefore, a storage area for storing three-dimensional shape data shrinks.

The detailed contents of a process performed in each of the steps described in FIGS. 9 through 11 will now be described.

(Calculation of Actual Subdivision Number)

The details of the process of calculating an actual subdivision number shown in step S16 in FIG. 9 and step S25 in FIG. 10 will now be described.

In this embodiment, edges indicative of the shape of a face that forms a three-dimensional shape are defined by the parametric cubic expression $$F(t)$$

where $0 \leq t \leq 1$.

By using the parametric cubic expression, the midpoint of an edge can be calculated easily. That is to say, by substituting $t=\frac{1}{2}$ in the parametric cubic expression, the coordinates of the midpoint can be calculated easily (without applying a load on the CPU).

If the edge given by the parametric cubic expression is a curve, then the edge is subdivided into a plurality of segments (approximated by a polyline) when the three-dimensional shape is displayed. In this case, the more the number (subdivision number) of the segments is, the more closely a shape formed by the segments resembles the original curve (the smaller the error becomes). However, an increase in the number of the segments will lead to an increase in the number of polygons to be displayed, resulting in a heavy processing load. Accordingly, a permissible error (tolerance (Tol)) is given to the computer 100 with a balance between accuracy with which the three-dimensional shape is reproduced and a processing load taken into consideration, and an appropriate subdivision number (minimum subdivision number which does not cause an error greater than the tolerance) must be determined according to the tolerance.

In general, to calculate the minimum subdivision number within given tolerance, calculations that cause a heavy load must be made. For example, the subdivision number n for a circle with a radius of R can be calculated by $$n = \pi / \cos^{-1}(1 - Tol/R) \quad (1)$$

where $\pi$ is the ratio of the circumference of the circle to its diameter. For convenience, equation (1) will be referred to as a true equation. The arc cosine ($\cos^{-1}$) used in true equation (1) is a function that causes a heavy load on the CPU. Therefore, in this embodiment the following approximate expression will be used for speeding up the calculation of a subdivision number.

$$n \approx \pi \times \sqrt{(R/2Tol)} \quad (2)$$

Approximate expression (2) includes the radius R as a variable. The shape of the edge may be a simple circular arc or a free curve. Accordingly, if approximate expression (2) is used in its original form, the curvature (radius R) of the curve that defines the edge must be calculated before determination of an actual subdivision number. Therefore, in this embodiment the subdivision number n is calculated by the use of a base subdivision number (real number) calculated in advance under the conditions of reference size and unit tolerance without using the radius R.

Figure 12:
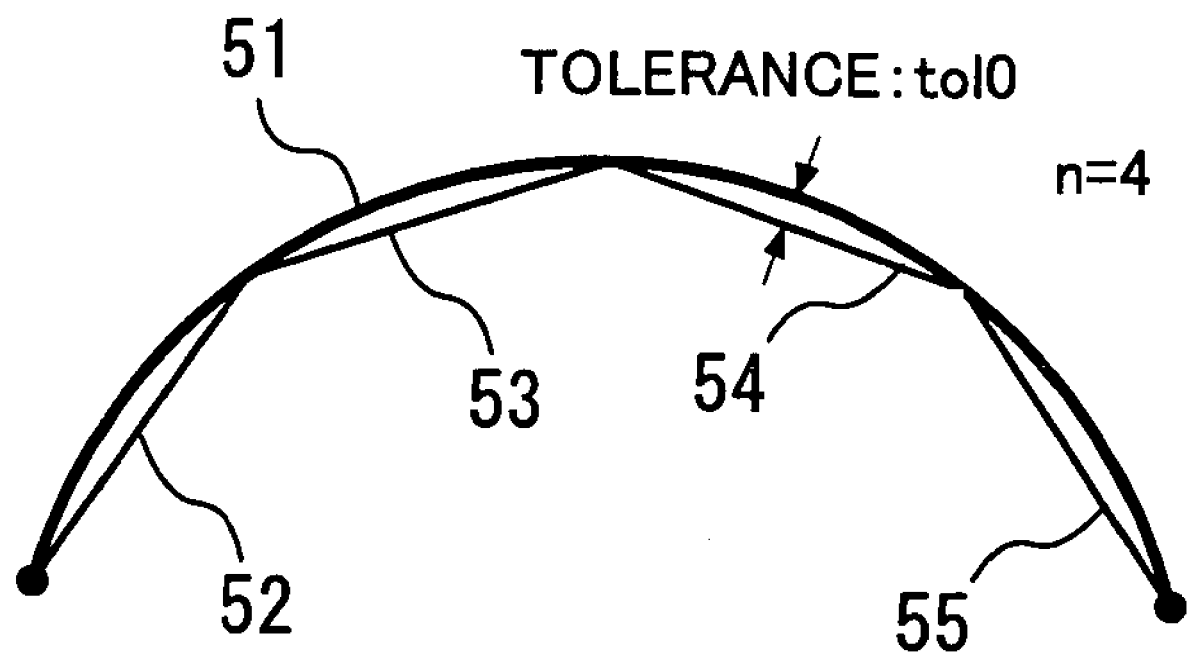
FIG. 12 shows an example of approximating a spatial curve by a polyline.

FIG. 12 shows an example of approximating a spatial curve by a polyline. In FIG. 12, a spatial curve 51 is subdivided into four segments 52 through 55. In this case, it is assumed that a tolerance of tol0 is given.

As stated above, it is assumed that the subdivision number n (the number of vectors that form the polyline) obtained in the case of approximating the spatial curve 51 by the polyline with a tolerance of tol0 is known (in this example, the subdivision number n=4). This known subdivision number n is considered as the base subdivision number n0. This size of the spatial curve 51 is set as reference size. The tolerance tol0 with which the base subdivision number n0 is calculated is considered as reference tolerance.

The user specifies how many times the spatial curve 51 to be displayed is larger than the reference size as a display scale. It is assumed that a display scale of Scale is arbitrarily specified by the user. Then the subdivision number N1 for a curve obtained by displaying the spatial curve 51 on a display scale of Scale is given by $$N1 \approx \sqrt{(Scale)} \times n0 \quad (3)$$

Furthermore, the user can specify accuracy with which the spatial curve 51 is displayed on the screen by the use of tolerance. The subdivision number N2 obtained when the reference tolerance tol0 is changed to the tolerance tol1 is given by $$N2 \approx \sqrt{(tol0/tol1)} \times n0 \quad (4)$$

Therefore, if the base subdivision number n0 for making an error smaller than the reference tolerance (tol0) under the condition of the reference size (Scale=1) is known, the actual subdivision number N for approximating a curve obtained by displaying the spatial curve 51 on a display scale of Scale by a polyline with a tolerance of Tol (=tol1/tol0) is given by $$N \approx \sqrt{(Scale/Tol)} \times n0 \quad (5)$$

The magnitude of the tolerance Tol is indicated with the reference tolerance tol0 as reference.

n0 is a characteristic value specific to the curve and does not depend on a display scale or tolerance. Accordingly, by calculating the base subdivision number n0 in advance, a subdivision number can be calculated at a high-speed when a display scale or tolerance is changed.

The value of $\sqrt{(Scale/Tol)}$ is common to all of the objects to be displayed in a three-dimensional space, so there is no need to calculate the value of $\sqrt{(Scale/Tol)}$ for each edge (spatial curve) of a three-dimensional shape (part, for example) included in an object (automobile, for example) to be displayed. That is to say, the actual subdivision number N for an edge according to a display scale and tolerance can be calculated by doing a multiplication once. The base subdivision number n0 is a positive real number. The actual subdivision number N is a natural number because fractions after the decimal point are counted as a unit.

Moreover, in this embodiment an actual subdivision number is rounded up to 2 to a power in order to obtain a simple subdivision pattern. By making an actual subdivision number for an edge 2 to a power, the subdivision of the edge into two parts is repeated and the edge can be subdivided into equal parts according to the actual subdivision number.

The base subdivision number n0 for a straight line is zero. As a result, the actual subdivision number N is always zero regardless of a display scale (Scale) or tolerance (Tol) This means that the straight line is not subdivided.

An example of subdividing a figure will now be described.

Figure 13:
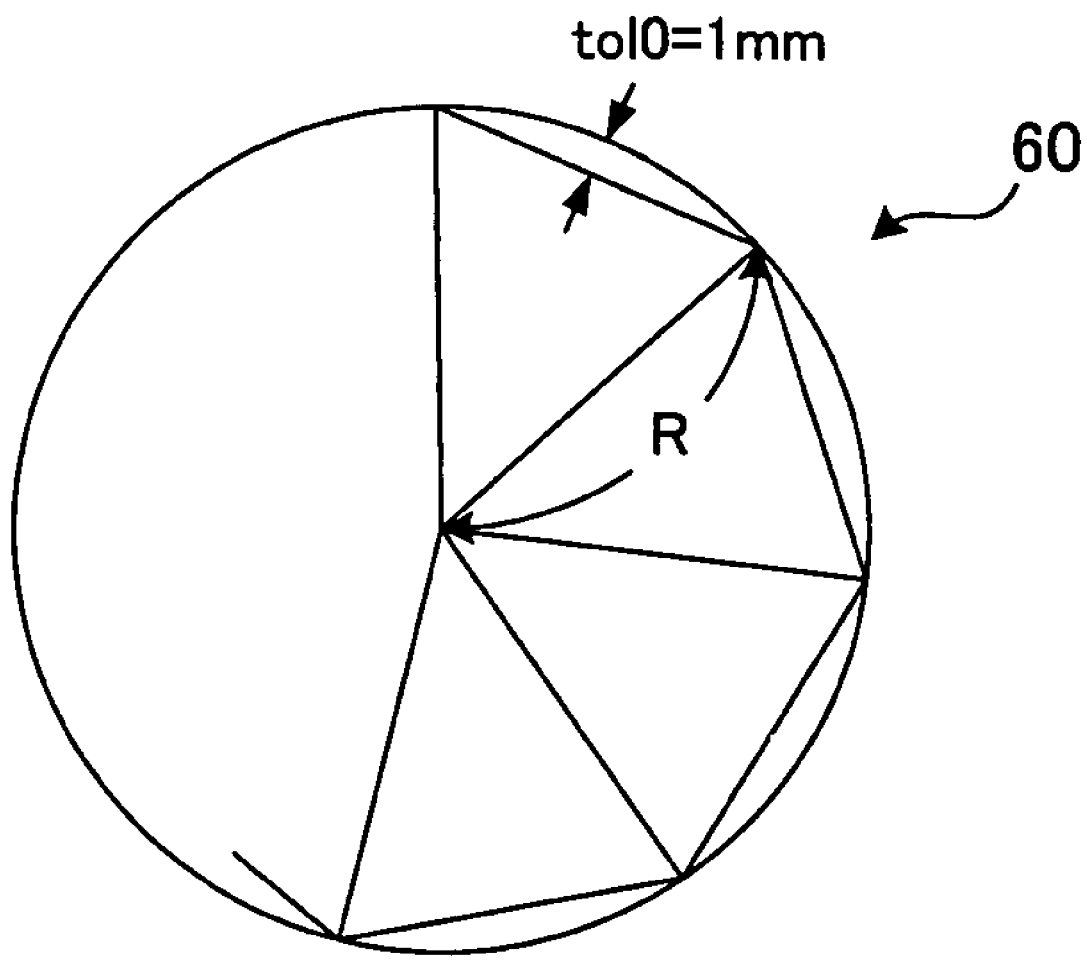
FIG. 13 shows an example of subdivision of a figure.

FIG. 13 shows an example of subdivision of a figure. In FIG. 13, a circle 60 is shown as an example of a simple figure. The subdivision number n for the circle 60 to the radius R of which different values are given will be calculated by the use of true equation (1). A subdivision number obtained is considered as the base subdivision number n0 corresponding to the radius R of the circle 60 having each value. In this case, the reference tolerance tol0 is 1 mm. The relationship between a change of the radius R and the base subdivision number n0 is as follows.

| RADIUS R | 1000 | 100 | 10 | 5 | 2 | 1 | 0.5 | 0.1 |
|---|---|---|---|---|---|---|---|---|
| Tolerance Tol | 1 | 1 | 1 | 1 | 1 | 1 | 1 | 1 |
| BASE SUBDIVISION NUMBER n0 | 72.24 | 2.20 | 6.97 | 4.88 | 3.00 | 2.00 | 1.00 | — |

As shown in this table, the greater the value of the radius R becomes, the greater the base subdivision number n0 becomes. When the value of the radius R is smaller than 0.5 mm, the base subdivision number n0 cannot be calculated because arc cosine calculation cannot be performed.

The actual subdivision number N according to a display scale and tolerance is calculated from the base subdivision number n0 obtained in this way.

For example, if the circle with a radius of 10 mm is approximated on a display scale of 100 (Scale=100) with a tolerance of 1 mm (Tol=1), the actual subdivision number N is calculated by using the base subdivision number n0=6.97. By substituting these numeric values for the variables in approximate expression (5), the following value is obtained.

$$N \approx \sqrt{(100)} \times 6.97 = 69.7 \qquad (6)$$

By counting the fraction after the decimal point of the actual subdivision number N as a unit, the value 70 is obtained. A subdivision number on a display scale of 100 must be equal to a subdivision number for the circle with a radius the value of which is hundred times as great as the above value. In this example, by calculating a subdivision number for the circle with a radius of 1,000 mm (=10 mm×100) by using true equation (1), the value 70.24 is obtained. By counting the fractions after the decimal point of this value as a unit, the value 71 is obtained. This indicates that the circle 60 is approximated with sufficient accuracy.

A subdivision number for subdividing the circle with a radius of 0.1 mm with a tolerance of 1 mm cannot be calculated by using true equation (1). However, it should be possible to approximate this subdivision number by displaying the circle with a radius of 10 mm on a display scale of 1/100. Therefore, the following value is obtained.

$$n0(r=0.1) \approx 1/\sqrt{(100)} \times 6.97 = 0.697 \qquad (7)$$

(Process of Determining Division Pattern)

The process of determining a subdivision pattern performed in step S32 or S33 shown in FIG. 11 will now be described in detail.

(Process of Determining Triangle Division Pattern)

The process of determining a triangle figure subdivision pattern will be described first in detail. In this embodiment, a subdivision number for each edge is 2 to a power, so all triangles can be subdivided by combining four different subdivision patterns.

FIG. 14 shows different triangle subdivision patterns. In FIG. 14, subdivision patterns corresponding to the interrelations of subdivision numbers N for three edges are shown by subdivided figures.

A first triangle subdivision pattern is used where subdivision numbers for the three edges are N, N×a1, and N×a2 (N is greater than one and is 2 to a power) respectively. In this case, a1 and a2 are 2 to a power. That is to say, each of the three edges can be subdivided by the same subdivision number N. As shown by the subdivided figure, the coordinates of subdivision points on each edge represented by a parametric cubic expression and normal vectors at the subdivision points are determined according to the subdivision number N and intermediate subdivision lines for the triangle are determined. The original triangle is subdivided into a large number of triangles by the intermediate subdivision lines.

A second triangle subdivision pattern is used where subdivision numbers for the three edges are 1, N, and N×a3 (N is greater than one and is 2 to a power) respectively. In this case, a3 is 2 to a power. That is to say, two edges subdivision numbers for which are greater than one can be subdivided by the same subdivision number N. As shown by the subdivided figure, the coordinates of subdivision points on each of the two edges to be subdivided represented by parametric cubic expressions and normal vectors at the subdivision points are determined according to the subdivision number N and intermediate subdivision lines for the triangle are determined. The original triangle is subdivided into a large number of triangles by the intermediate subdivision lines.

A triangle subdivision pattern is used where subdivision numbers for the three edges are 1, 1, and N (N is greater than one and is 2 to a power) respectively. That is to say, only one edge is subdivided. As shown by the subdivided figure, the coordinates of subdivision points on the edge to be subdivided represented by a parametric cubic expression and normal vectors at the subdivision points are determined according to the subdivision number N and intermediate subdivision lines for the triangle are determined. The original triangle is subdivided into a large number of triangles by the intermediate subdivision lines.

A fourth triangle subdivision pattern is used where subdivision numbers for the three edges are all 1. In this case, the original triangle is not subdivided.

By repeating subdivision step by step according to the above four patterns (three patterns, actually, because subdivision is not made according to the fourth triangle subdivision pattern), the triangle is subdivided according to an actual subdivision number for each edge. The first subdivision pattern, the second subdivision pattern, and the third subdivision pattern are used in that order for subdividing a triangle.

Figure 15:
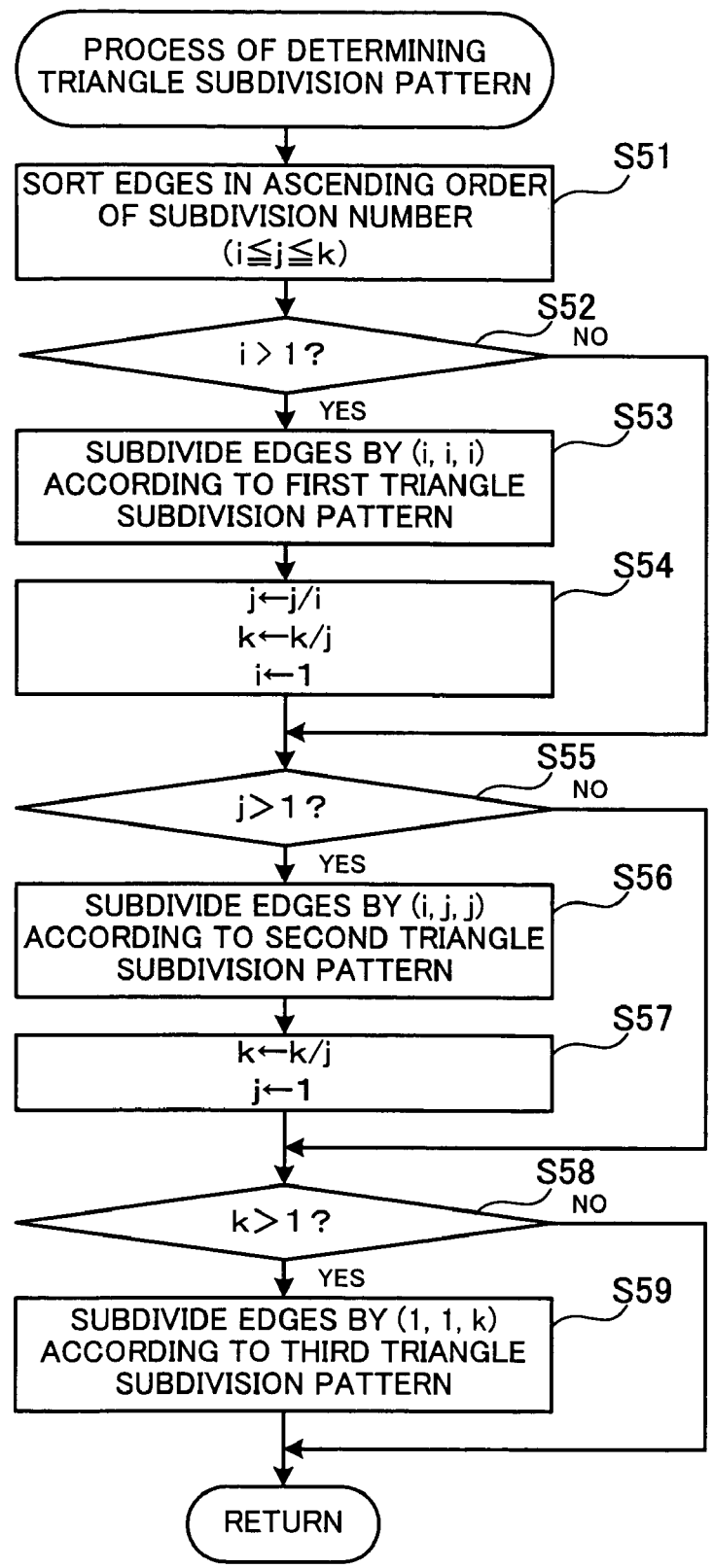
FIG. 15 is a flow chart showing a procedure for determining a triangle subdivision pattern.

FIG. 15 is a flowchart showing a procedure for determining a triangle subdivision pattern. This process is performed in step S32 shown in FIG. 11. In step S35 shown in FIG. 11, subdivision is made through many stages by recursively performing the subdivision process (subdivision is made according to one subdivision pattern at one stage). In FIG. 15, however, the subdivision process performed through the many stages is shown by a flow chart for the sake of simplicity. The process shown in FIG. 15 will now be described in order of step number.

[Step S51] The subdivision section 116 sorts edges in ascending order of actual subdivision number. In this case, it is assumed that subdivision numbers for the edges are i, j, and k ($i \leq j \leq k$) respectively.

[Step S52] The subdivision section 116 determines whether i is greater than one. If i is greater than one, then step S53 is performed. If i is smaller than or equal to one, then step S55 is performed.

[Step S53] The subdivision section 116 subdivides the edges by (i, i, i) according to the first triangle subdivision pattern.

[Step S54] The subdivision section 116 updates the values of i, j, and k. To be concrete, the subdivision section 116 sets j to the value of j/i, sets k to the value of k/i, and sets i to one.

[Step S55] The subdivision section 116 determines whether j is greater than one. If j is greater than one, then step S56 is performed. If j is smaller than or equal to one, then step S58 is performed.

[Step S56] The subdivision section 116 subdivides the edges by (i, j, j) according to the second triangle subdivision pattern.

[Step S57] The subdivision section 116 updates the values of j and k. To be concrete, the subdivision section 116 sets k to the value of k/j and set j to one.

[Step S58] The subdivision section 116 determines whether k is greater than one. If k is greater than one, then step S59 is performed. If k is smaller than or equal to one, then step S34 shown in FIG. 11 is performed.

[Step S59] The subdivision section 116 subdivides the edges by (1, 1, k) according to the triangle subdivision pattern. Then step S34 shown in FIG. 11 is performed.

As described above, a subdivision pattern for a face that forms a triangle can be determined according to an actual subdivision number for each edge. After the subdivision pattern is determined, the triangle is subdivided in steps S34 and S35 shown in FIG. 11.

It is assumed that the results of (5, 21, 12) are obtained by calculating an actual subdivision number for each edge of the triangle by the use of approximate expression (5). Each of these values is rounded up to 2 to a power and (8, 32, 16) are obtained. The subdivision numbers for the edges are sorted in ascending order. Then the results of i=8, j=16, and k=32 (8, 16, 32) are obtained.

First, i is greater than one, so subdivision is made according to the first subdivision pattern. As a result, each edge is subdivided into eight parts. Then the values of i, j, and k are updated and (1, 2, 4) are given.

Next, j is greater than one, so subdivision is made according to the second subdivision pattern. As a result, each of the edges corresponding to j and k is subdivided into two parts. Accordingly, each triangle is subdivided further into a plurality of triangles. Then the values of j and k are updated and (1, 1, 2) are given.

k is greater than one, so subdivision is made according to the third subdivision pattern. As a result, the edge corresponding to k is subdivided into two parts. Accordingly, each triangle is subdivided into a plurality of triangles.

The triangle can be subdivided in this way.

(Process of Determining Rectangle Figure Division Pattern)

Next, the process of determining a rectangle subdivision pattern will be described in detail. In this embodiment, a subdivision number for each edge is 2 to a power, so all rectangles can be subdivided by combining four different subdivision patterns.

Figure 16:
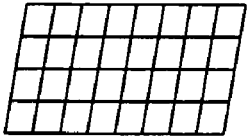
FIG. 16 shows different rectangle subdivision patterns.
Figure 16:
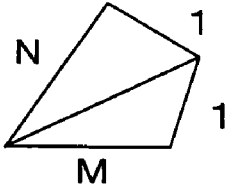
Figure 16:
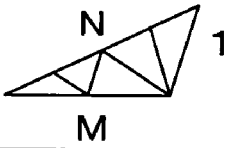
Figure 16:

FIG. 16 shows different rectangle subdivision patterns. In FIG. 16, subdivision patterns corresponding to the interrelations of subdivision numbers N for four edges are shown by subdivided figures.

A first subdivision pattern is used where subdivision numbers for the four edges considered as two groups of opposite edges are (M, M×b1) and (N, N×b2) (M and N are greater than one and are 2 to a power) respectively (two values in the same parentheses are subdivision numbers for a group of opposite edges). In this case, b1 and b2 are 2 to a power. That is to say, opposite edges can be subdivided by the same subdivision number. As shown by the subdivided figure, one group of opposite edges are subdivided by M and the other group of opposite edges are subdivided by N. As a result, the original rectangle is subdivided into a plurality of rectangles.

A second subdivision pattern is used where subdivision numbers for the four edges considered as two groups of opposite edges are (1, M) and (1, N) (M and N are greater than one, M and N are 2 to a power, and M≦N) respectively. That is to say, one of opposite edges is subdivided. As shown by the subdivided figure, two neighboring edges of the four edges are to be subdivided. A diagonal is drawn from an end point shared by the two edges to be subdivided to the opposite end point. The rectangle is subdivided into two triangles by the diagonal. By making a subdivision number for the diagonal N, the two triangles generated can be subdivided according to a subdivision pattern for a triangle. To be concrete, the two triangles generated are subdivided according to a third or fourth subdivision pattern.

The third subdivision pattern is used where two edges of one triangle are subdivided into N and M parts respectively. This triangle can be subdivided by combining the second and third triangle subdivision patterns.

The fourth subdivision pattern is used where each of two edges of the other triangle is subdivided into N parts. This triangle can be subdivided according to the second triangle subdivision pattern.

A rectangle can be subdivided according to the above subdivision patterns.

Figure 17:
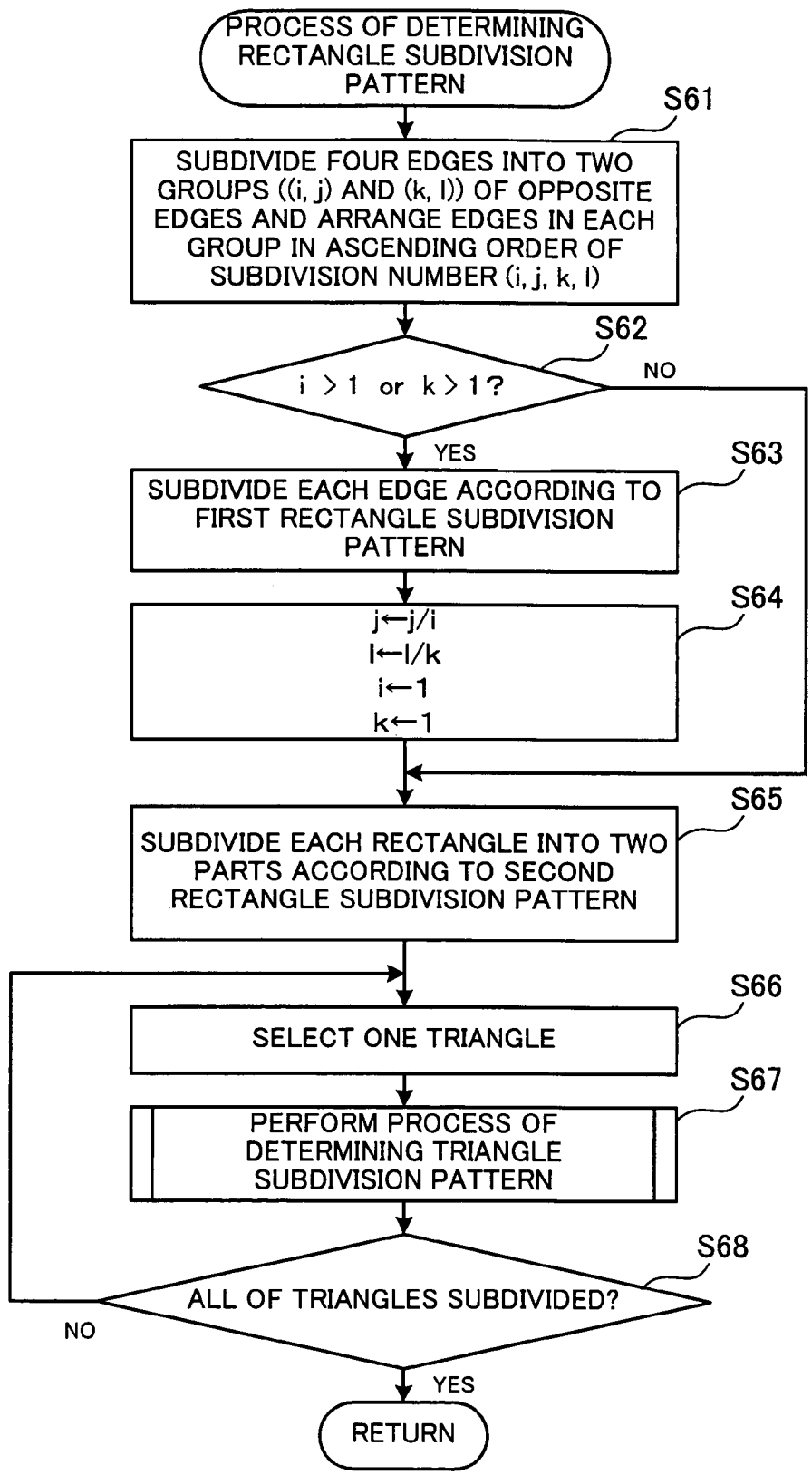
FIG. 17 is a flow chart showing a procedure for determining a rectangle subdivision pattern.

FIG. 17 is a flow chart showing a procedure for determining a rectangle subdivision pattern. This process is performed in step S33 shown in FIG. 11. In step S35 shown in FIG. 11, subdivision is made through many stages by recursively performing the subdivision process (subdivision is made according to one subdivision pattern at one stage). In FIG. 17, however, the subdivision process performed through the many stages is shown by a flow chart for the sake of simplicity. The process shown in FIG. 17 will now be described in order of step number.

[Step S61] The subdivision section 116 subdivides four edges into two groups of opposite edges. The subdivision section 116 compares the ratio of subdivision numbers (greater subdivision number/smaller subdivision number) for two edges that form one group with the ratio of subdivision numbers for two edges that form the other group. Then the subdivision section 116 arranges these groups in ascending order of ratio of subdivision numbers. In each group, edges are arranged in ascending order of subdivision number. It is assumed that subdivision numbers for the edges arranged in order in this way are i, j, k, and l respectively. The edge the subdivision number for which is i and the edge the subdivision number for which is j forms a group and the edge the subdivision number for which is k and the edge the subdivision number for which is l forms a group. In this case, i≦j, k≦l, and j/i≦l/k.

[Step S62] The subdivision section 116 determines whether at least one of i and k is greater than one. If one of i and k is greater than one, then step S63 is performed. If both of them are smaller than or equal to one, then step S65 is performed.

[Step S63] The subdivision section 116 subdivides the rectangle according to the first rectangle subdivision pattern. That is to say, the edges the subdivision numbers for which are i and j are subdivided by i and the edges the subdivision numbers for which are k and l are subdivided by k.

[Step S64] The subdivision section 116 updates the values of i, j, k, and l. To be concrete, the subdivision section 116 sets j to the value of j/i, sets l to the value of l/k, sets i to one, and sets k to one.

[Step S65] The subdivision section 116 subdivides each of rectangle generated by the subdivision in step S63 into two parts according to the second four-edge figure subdivision pattern. As a result, two triangles are generated from each rectangle.

[Step S66] The subdivision section 116 selects one of the triangles generated in step S65.

[Step S67] The subdivision section 116 performs the process of determining a rectangle subdivision pattern for the rectangle selected in step S66. For example, if the rectangel selected follows the third rectangle subdivision pattern, then a subdivision pattern for the triangle is determined according to the second and third rectangle subdivision patterns. If the triangle selected follows the fourth rectangle subdivision pattern, then a subdivision pattern for the triangle is determined according to the second triangle subdivision pattern.

[Step S68] The subdivision section 116 checks whether all of the triangles generated in step S65 are subdivided. If subdivision patterns for all of the triangles are determined, step S34 shown in FIG. 11 is performed. If there is a triangle still to be dealt with, then step S66 is performed.

As described above, a subdivision pattern for a face that forms a rectangle can be determined according to an actual subdivision number for each edge. After the subdivision pattern is determined, the rectangle is subdivided in steps S34 and S35 shown in FIG. 11.

It is assumed that the results of (6, 2, 12, 7) are obtained by calculating an actual subdivision number for each edge of the rectangle by the use of approximate expression (5). The edges the subdivision numbers for which are 6 and 2, respectively, are opposite to each other. The edges the subdivision numbers for which are 12 and 7, respectively, are opposite to each other. Each of these values is rounded up to 2 to a power and (8, 2, 16, 8) are obtained. The two groups are arranged in ascending order of ratio of subdivision numbers. In each group, edges are arranged in ascending order of subdivision number. Then the results of i=8, j=16, k=2, and l=8 (8, 16, 2, 8) are obtained.

First, i and k are greater than one, so subdivision is made according to the first rectangle subdivision pattern. As a result, each of the edges the subdivision numbers for which are i and j, respectively, is subdivided into eight parts. Similarly, each of the edges the subdivision numbers for which are k and l, respectively, is subdivided into two parts. Then the values of i, j, k, and l are updated and (1, 2, 1, 4) are given.

Next, each of rectangles generated by the subdivision according to the first rectangle subdivision pattern is subdivided into two parts by a diagonal according to the second rectangle subdivision pattern. A subdivision number set for the diagonal is the same as the value of l. As a result, two triangle subdivision numbers for which are (1, j, l) and (1, l, l), respectively, are generated. That is to say, two triangles subdivision numbers for which are (1, 2, 4) and (1, 4, 4), respectively, are generated.

j (=2) is greater than one, so the triangle the subdivision numbers for which are (1, 2, 4) is subdivided according to the second triangle subdivision pattern. Then each of the edges corresponding to j and l is subdivided into two parts. As a result, the triangle is subdivided further into a plurality of triangles. Then the values of j and l are updated and (1, 1, 2) are given. l is greater than one, so subdivision is made according to the third triangle subdivision pattern. As a result, the edge corresponding to l is subdivided into two parts.

l (=4) is greater than one, so the triangle the subdivision numbers for which are (1, 4, 4) is subdivided according to the second triangle subdivision pattern. Then the edge corresponding to l is subdivided into four parts. As a result, the triangle is subdivided further into a plurality of triangles.

The rectangle is subdivided into a plurality of rectangles in this way.

(How to Determine Parametric Cubic Expression)

To subdivide an edge, a parametric cubic expression is determined according to normal vectors set for end points on the edge. Then the middle point of the edge is found by substituting 0.5 for the parameter t ($0 \leq t \leq 1$) in the parametric cubic expression that defines the edge, being a curve. How to determine a parametric cubic expression differs according to neighboring relationships between faces of a three-dimensional shape.

A first neighboring relationship corresponds to the case where neighboring faces connect smoothly. In this case, there are two methods. One method is to determine tangent vectors from normal vectors and to determine a parametric cubic expression from the tangent vectors. The other method is to presume second derivative vectors from normal vectors and to determine a parametric cubic expression from the second derivative vectors.

A second neighboring relationship corresponds to the case where neighboring faces bend sharply at the edge they share.

A third neighboring relationship corresponds to the case where the shape of an edge must be designated forcibly.

How to determine a parametric cubic expression according to neighboring relationships between faces will now be described.

(Case where Neighboring Faces Connect Smoothly)

Figure 18:
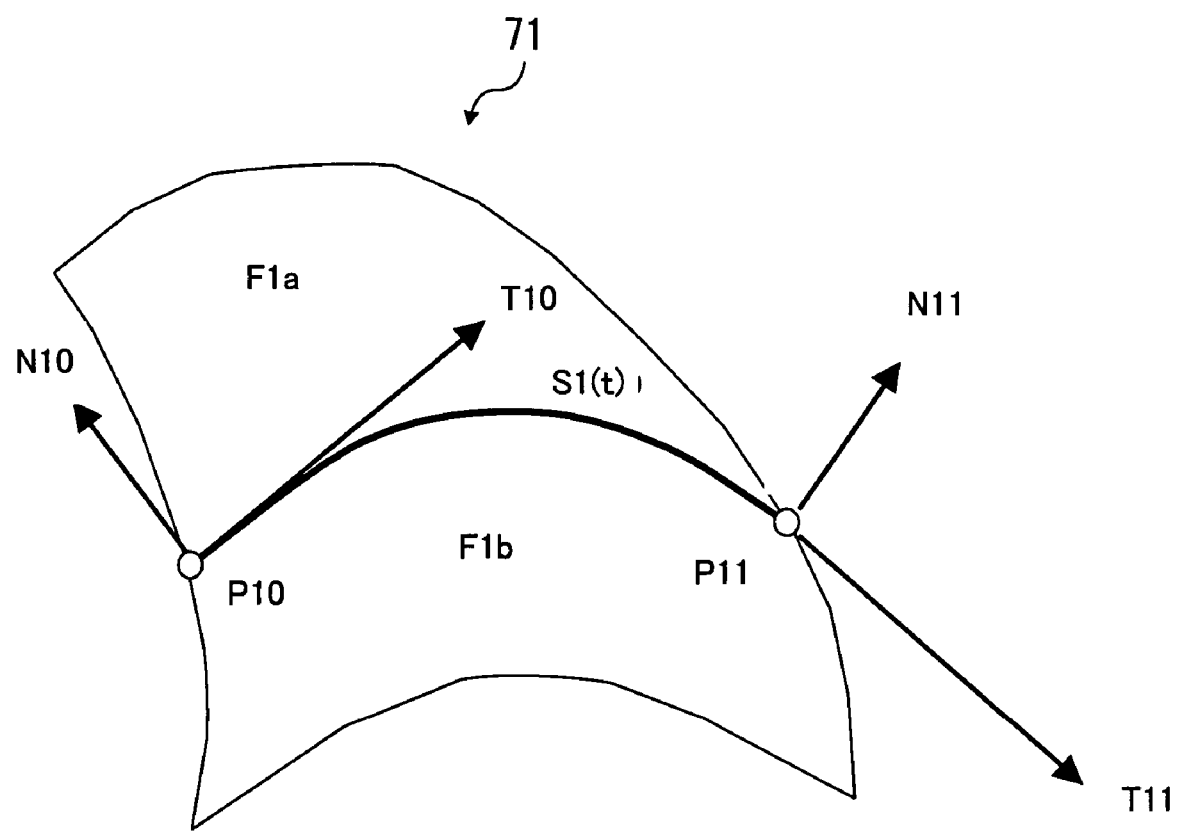
FIG. 18 shows an example of a three-dimensional shape on which neighboring faces connect smoothly.

FIG. 18 shows an example of a three-dimensional shape on which neighboring faces connect smoothly. As shown in FIG. 18, a three-dimensional shape 71 has faces F1a and F1b that neighbor each other. The neighboring faces F1a and F1b share not only an edge S1(t) but also normal vectors N10 and N11 at both end points of the edge S1(t). In this case, the neighboring faces F1a and F1b are considered to connect smoothly at the edge S1(t).

In such a case, a parametric cubic expression can be determined by one of the following two methods.

A method for determining tangent vectors from normal vectors and determining a parametric cubic expression from the tangent vectors will be described first.

In this method, tangent vectors T10 and T11 are determined by giving coordinates P10 and P11 of both end points, the normal vectors N10 and N11 at both end points, and lengths r10 and r11 of tangents at both endpoints. These pieces of data are defined in end point information stored in the three-dimensional structure data storage section 120.

The tangent vector T10 is perpendicular to the normal vector N10, has a direction the closest to the direction from the coordinate P10 to the coordinate P11, and has a length of r10. The tangent vector T11 is perpendicular to the normal vector N11, has a direction the closest to the direction from the coordinate P10 to the coordinate P11, and has a length of r11.

This can be expressed as follows:

$$T10 = r10 \cdot N10 \times (P11-P10) \times N10 / |N10 \times (P11-P10) \times N10| \quad (8)$$

$$T11 = r11 \cdot N11 \times (P11-P10) \times N11 / |N11 \times (P11-P10) \times N11| \quad (9)$$

In expressions (8) and (9), "×" indicates the outer product of vectors and "·" indicates the multiplication of scalar values (such as r10 or r11).

Then the coordinates P10 and P11 of both end points and the tangent vectors T10 and T11 at both end points are used to determine a parametric cubic expression S1(t) that satisfies the four vector equations:

$$S1(t=0) = P10$$

$$S1(t=1) = P11$$

$$dS1/dt(t=0) = T10$$

$$dS1/dt(t=1) = T11 \quad (10)$$

As described above, by determining conditions at the endpoints, a curve in a three-dimensional space can be determined. For example, a Ferguson curve can be calculated.

Next, a method for presuming second derivative vectors from normal vectors and determining a parametric cubic expression from the second derivative vectors will be described.

Figure 19:
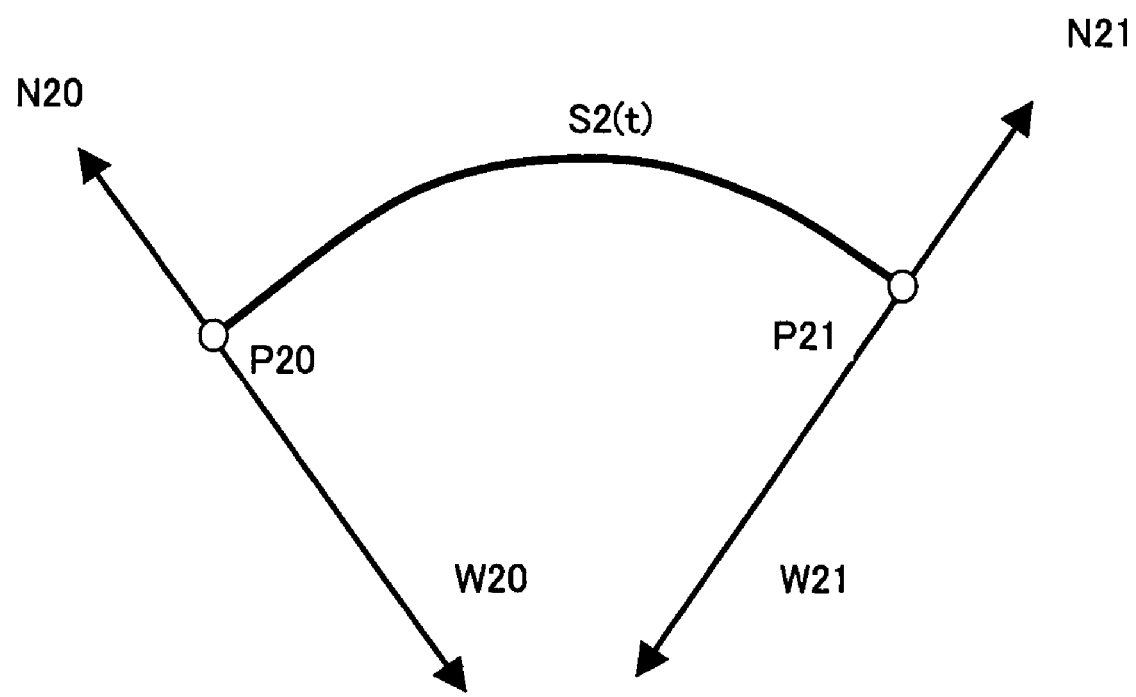
FIG. 19 shows an example of a parametric cubic expression determined by the use of second derivative vectors.

FIG. 19 shows an example of a parametric cubic expression determined by the use of second derivative vectors. As shown in FIG. 19, it can be assumed that the directions of second derivative vectors W20 and W21 at both end points are close to the directions of normal vectors N20 and N21, respectively, at both end points (their positive or negative signs may not match). (However, the directions of the second derivative vectors W20 and W21 at both end points are not identical to the directions of normal vectors N20 and N21, respectively, at both end points because the second derivative is not performed on the basis of an arc length parameter.) In this case, the second derivative vectors W20 and W21 are obtained by multiplying the normal vectors N20 and N21 by the vector magnitudes r20 and r21 respectively.

The normal vectors N20 and N21 always have the direction of the outside of the face. Therefore, the vector magnitudes r20 and r21 are made negative at need so that the appropriate positive or negative signs of the directions of the second derivative vectors W20 and W21 will be obtained. For example, if the curve is convex in the direction of the outside of the three-dimensional shape, then the vector magnitudes r20 and r21 are made negative. If the curve is concave in the direction of the outside of the three-dimensional shape, then the vector magnitudes r20 and r21 are made positive. The vector magnitudes r20 and r21 are set in advance in the tangent definition information 426c in the end point information 426 shown in FIG. 6.

The second derivative vectors W20 and W21 approximate to vectors, respectively, which are parallel to the normal vectors N20 and N21 and the lengths and directions of which are indicated by r20 and r21. This can be expressed as follows:

$$W20 = r20 \cdot N20 \quad (11)$$

$$W21 = r21 \cdot N21 \quad (12)$$

Coordinates P20 and P21 of both end points and the second derivative vectors W20 and W21 at both end points are used to determine a parametric cubic expression S2(t) from the four vector equations:

$$S2(t=0) = P20$$

$$S2(t=1) = P21$$

$$d^2S2/dt^2(t=0) = W20$$

$$d^2S2/dt^2(t=1) = W21 \quad (13)$$

The parametric cubic expression S2(t) that meets these conditions is determined.

(Case where Neighboring Faces Bend Sharply at Edge They Share)

Next, how to determine a parametric cubic expression in the case where neighboring faces bend sharply at the edge they share will now be described.

Figure 20:
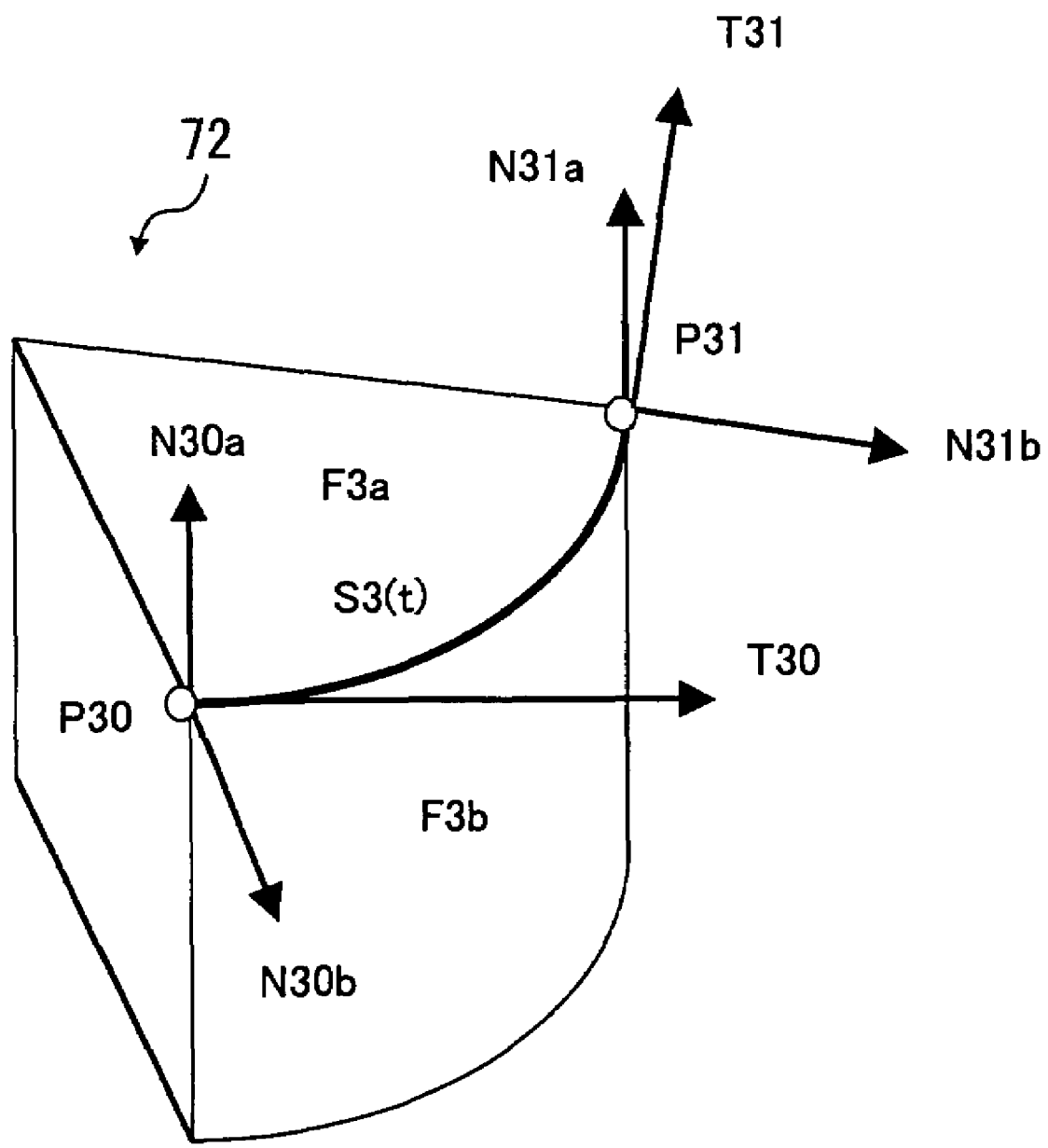
FIG. 20 shows an example of a three-dimensional shape on which neighboring faces bend sharply at the edge they share.

FIG. 20 shows an example of a three-dimensional shape on which neighboring faces bend sharply at the edge they share. On a three-dimensional shape 72 shown in FIG. 20, faces F3a and F3b neighbor each other at an edge S3(t). Each of normal vectors N30a and N31a for the face F3a does not include a component that curves the edge S3(t). On the other hand, each of normal vectors N30b and N31b for the face F3b that neighbors the face F3a includes a component that curves the edge S3(t).

If the normal vectors at both end points of the edge S3(t) shared by the neighboring faces F3a and F3b are not shared by the faces F3a and F3b, then the determination that the neighboring faces F3a and F3b bend sharply at the edge S3(t) they share is made. In this case, the direction of a tangent vector is determined by the use of the four normal vectors.

A tangent vector T30 has a direction given by the outer product of the normal vectors N30a and N30b and a length of r30. Similarly, a tangent vector T31 has a direction given by the outer product of the normal vectors N31a and N31b and a length of r31. r30 is the length of a tangent defined at the end point 30 and r31 is the length of a tangent defined at the end point 31. This can be expressed as follows:

$$T30 = r30 \cdot N30a \times N30b / |N30a \times N30b| \quad (14)$$

$$T31 = r31 \cdot N31a \times N31b / |N31a \times N31b| \quad (15)$$

Then coordinates P30 and P31 of both end points and the tangent vectors T30 and T31 at both end points are used to determine a parametric cubic expression S3(t) that satisfies the four vector equations:

$$S3(t=0) = P30$$

$$S3(t=1) = P31$$

$$dS3/dt(t=0) = T30$$

$$dS3/dt(t=1) = T31 \quad (16)$$

(Case where Shape of Edge must be Designated Forcibly)

The case where the shape of an edge must forcibly be designated will now be described.

Figure 21:
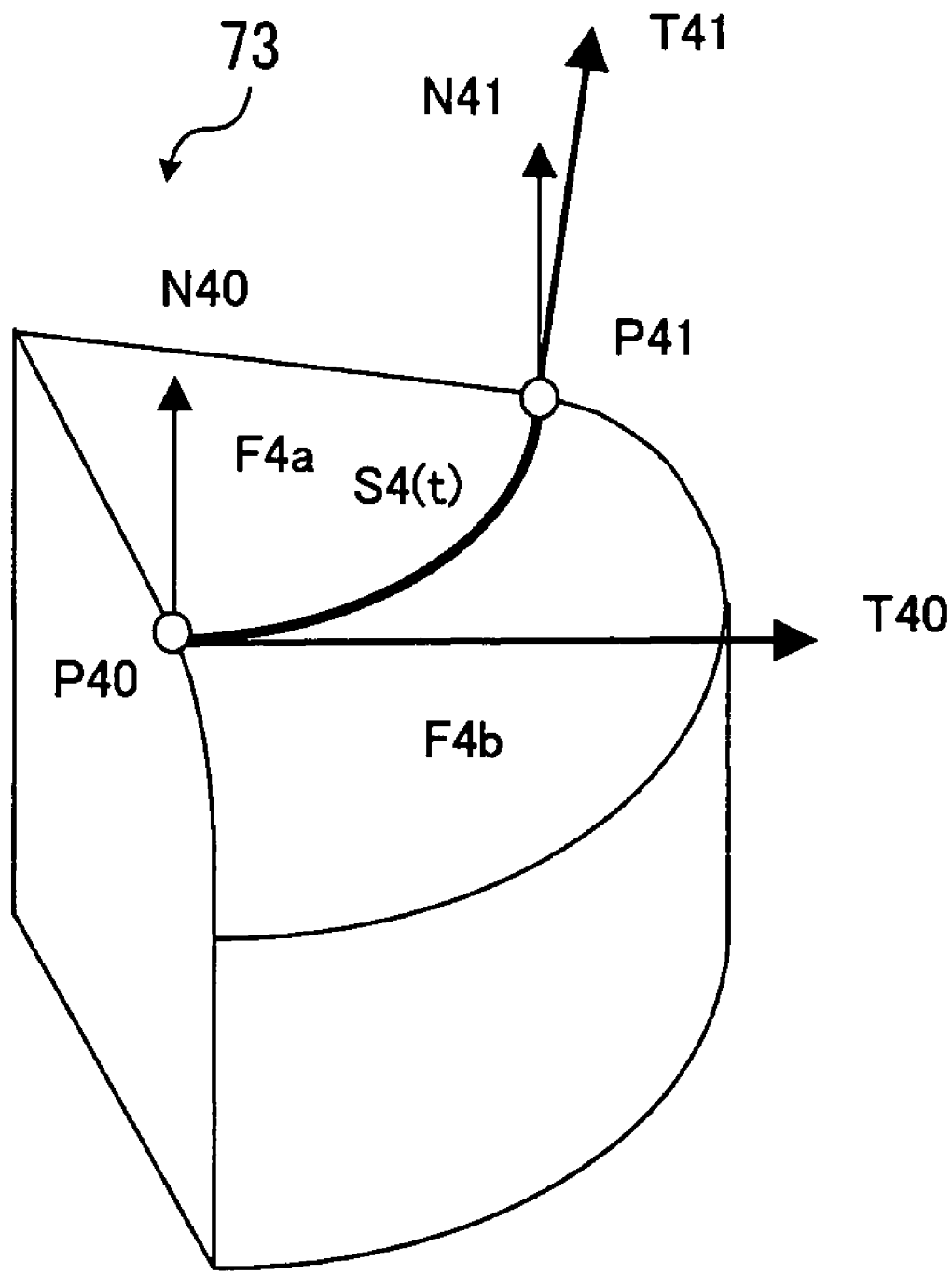
FIG. 21 shows an example of a three-dimensional shape on which the shape of an edge is designated forcibly.

FIG. 21 shows an example of a three-dimensional shape on which the shape of an edge is designated forcibly. On a three-dimensional shape 73 shown in FIG. 21, faces F4a and F4b neighbor each other. The neighboring faces F4a and F4b share not only an edge S4(t) but also normal vectors N40 and N41 at both end points of the edge S4(t). In this case, the determination that the neighboring faces F4a and F4b connect smoothly at the edge S4(t) is made, but each of the normal vectors N40 and N41 does not include a component that curves the edge S4(t).

If the edge S4(t) must be curved forcibly in such a case, tangent vectors T40 and T41 are given directly.

Coordinates P40 and P41 of both end points and the tangent vectors T40 and T41 at both end points are used to determine a parametric cubic expression S4(t) that satisfies the four vector equations:

$$S4(t=0)=P40$$

$$S4(t=1)=P41$$

$$dS4/dt(t=0)=T40$$

$$dS4/dt(t=1)=T41 \quad (17)$$

A parametric cubic expression for an edge that forms a three-dimensional shape can be determined in this way.

(How to Calculate Coordinates of Arbitrary Intermediate Point on Edge and Normal Vector at Intermediate Point)

When a parametric cubic expression that defines an edge, being a curve, is determined, the edge is subdivided into a plurality of parts according to a subdivision pattern previously determined. As a result, a plurality of end points newly occur. The position of each of these end points and a normal vector at each of these end points must be defined. How to calculate the coordinates (intermediate coordinates) of an intermediate point and a normal vector at the intermediate point will now be described.

(How to Calculate Intermediate Coordinates)

How to calculate intermediate coordinates will now be described with reference to FIG. 22.

Figure 22:
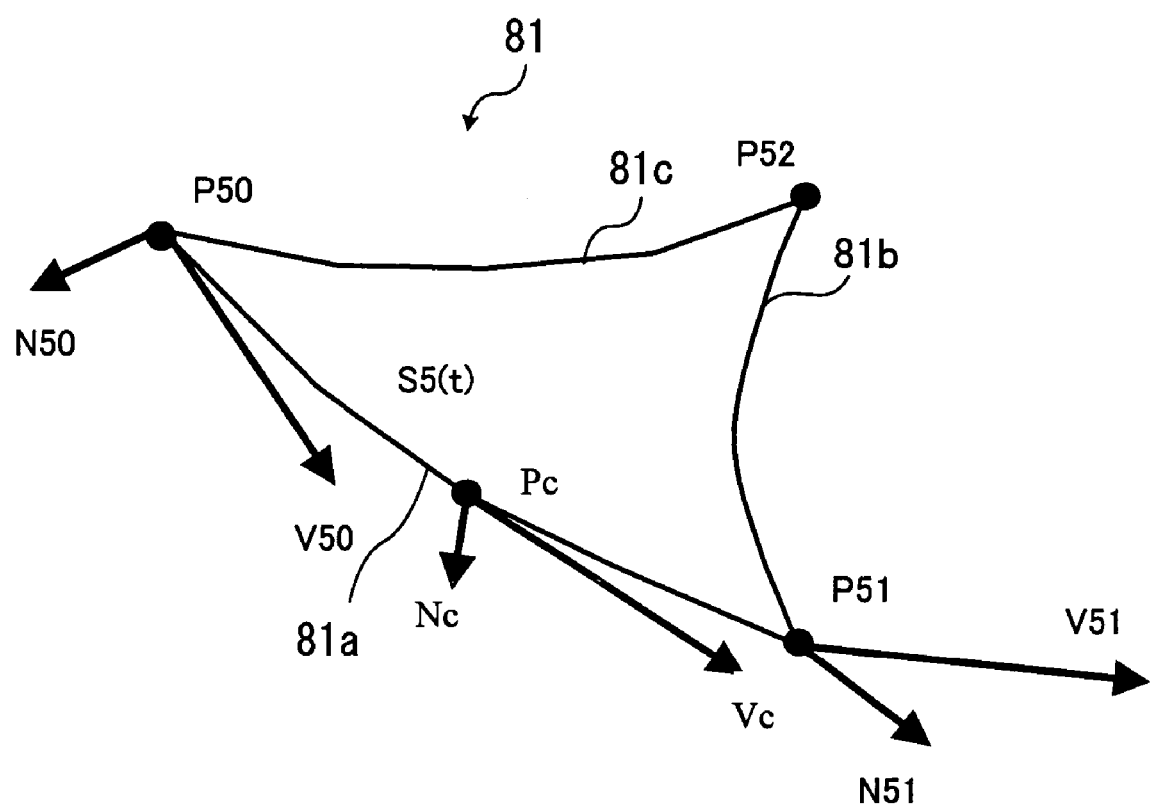
FIG. 22 shows an example of a face to be subdivided.

FIG. 22 shows an example of a face to be subdivided. In this example, a face 81 to be subdivided is a triangle. The face 81 is formed by an edge 81a having end points P50 and P51, an edge 81b having the end point P51 and an end point P52, and an edge 81c having the end points P52 and P50. A normal vector and a tangent vector at the end point P50 are N50 and V50 respectively. A normal vector and a tangent vector at the end point P51 are N51 and V51 respectively.

If a parametric cubic expression S5(t) for the edge 81a that connects the end points P50 and P51 is determined in accordance with the above method for determining a parametric cubic expression, an arbitrary point Pc on the edge 81a is determined by setting the value of t (t=0.5 for the middle point) in the parametric cubic expression S5(t).

Next, How to calculate a normal vector at an intermediate point will be described with reference to FIG. 22.

The following four methods can be used for determining a normal vector at an arbitrary intermediate point.

A first method is to assume that a normal vector Nc at an intermediate point changes linearly from N50 to N51. This can be expressed as follows:

$$Nc=(1-t)N50+(t)N51 \quad (18)$$

A second method is to assume that a normal vector Nc at an intermediate point changes linearly from N50 to N51 and that the normal vector Nc at the intermediate point is perpendicular to a tangent vector Vc at the intermediate point.

This can be expressed as follows:

$$Nc=Vc\times(N50+N51)\times Vc \quad (19)$$

A third method is to assume that a normal vector Nc at an intermediate point rotates from the direction of N50 to the direction of N51. This can be expressed as follows:

$$Nc=Vc\times N50\times N51 \quad (20)$$

However, if N50×N51=0, then the following expression is used.

$$Nc=Vc\times N50\times Vc \quad (21)$$

A fourth method is to assume that a normal vector Nc at an intermediate point changes from the direction of N50 to the direction of N51 on a cubic basis. This can be expressed as follows:

$$Nc=-2(N51-N50)t^3+3(N51-N50)t^2+N50 \quad (22)$$

A normal vector at an intermediate point is obtained by normalizing a vector Nc obtained by the use of one of expressions (18) through (22) to a unit vector.

(Method for Determining Arbitrary Intermediate Curve in Triangle)

When a triangle is subdivided, new edges are generated in the original triangle. Curve expressions indicative of the edges generated must be determined.

Figure 23:
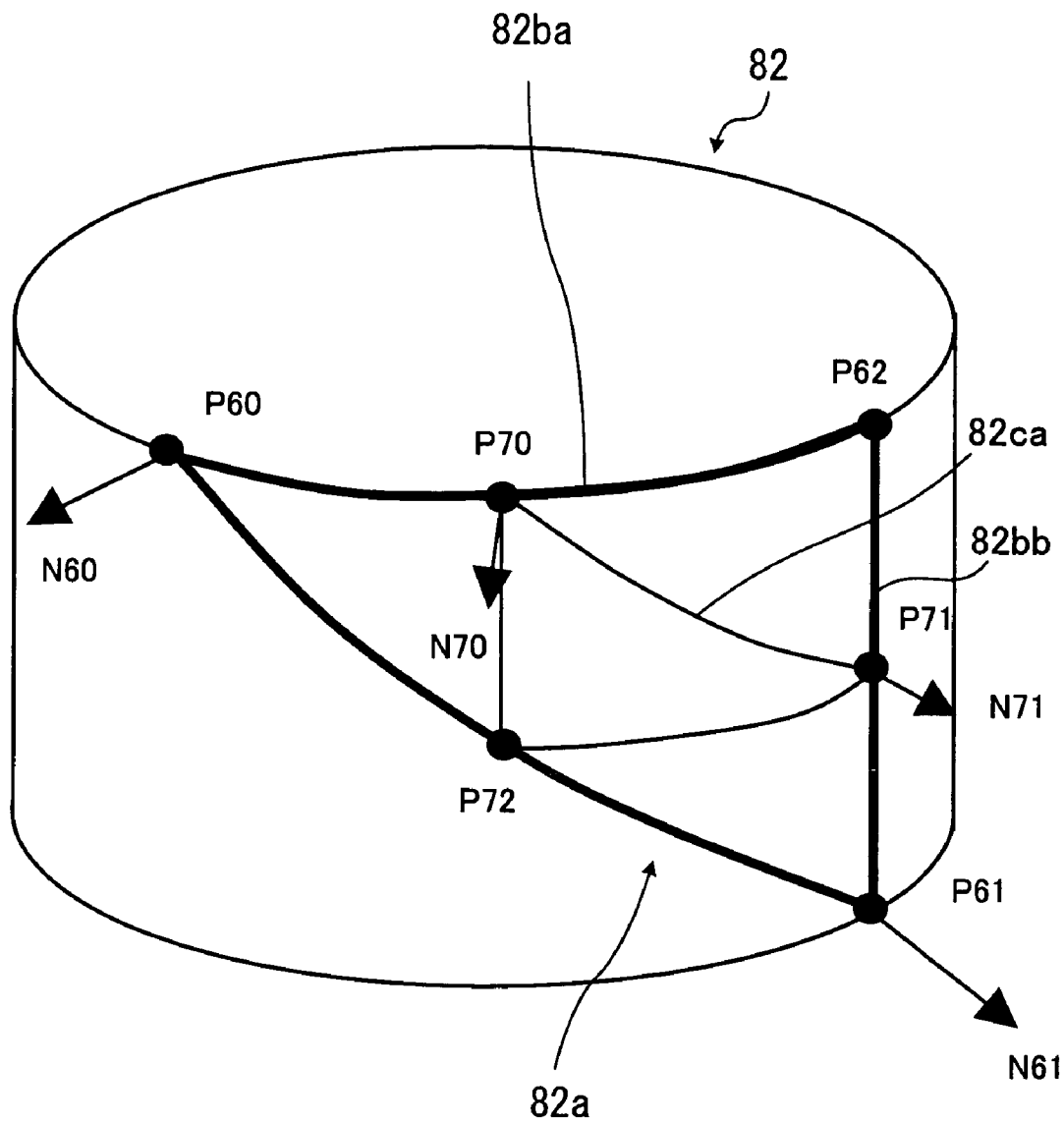
FIG. 23 shows an example of a triangle including a triangle to be subdivided.

FIG. 23 shows an example of a three-dimensional shape including a triangle to be subdivided. In this example, a three-dimensional shape 82, being a cylinder, is shown. The side of the three-dimensional shape 82 consists of a plurality of triangles. A triangle 82a, being one of these triangles, has end points P60, P61, and P62. The triangle 82a defined in hybrid mesh data is subdivided into, for example, a plurality of triangles when it is displayed as an image.

A parametric cubic expression for an edge 82ca that connects intermediate points on two edges 82ba and 82bb can be determined by the use of a coordinate P70 of the intermediate point on the edge 82ba, a normal vector N70 at the intermediate point on the edge 82ba, a coordinate P71 of the intermediate point on the edge 82bb, and a normal vector N71 at the intermediate point on the edge 82bb. For example, the method used in the case where neighboring faces connect smoothly is applied to determine a parametric cubic expression for the edge 82ca.

A length r70 of a tangent at the coordinate P70 and a length r71 of a tangent at the coordinate P71 are calculated by:

$$r70=r60\times|P71-P70|/|P61-P60| \quad (23)$$

$$r71=r61\times|P71-P70|/|P61-P60| \quad (24)$$

where r60 is the length of a tangent at the end point P60 and r61 is the length of a tangent at the end point P61.

(Another Method for Determining Arbitrary Intermediate Curve in Triangle)

An arbitrary intermediate curve in a triangle can be determined by another method.

Figure 24:
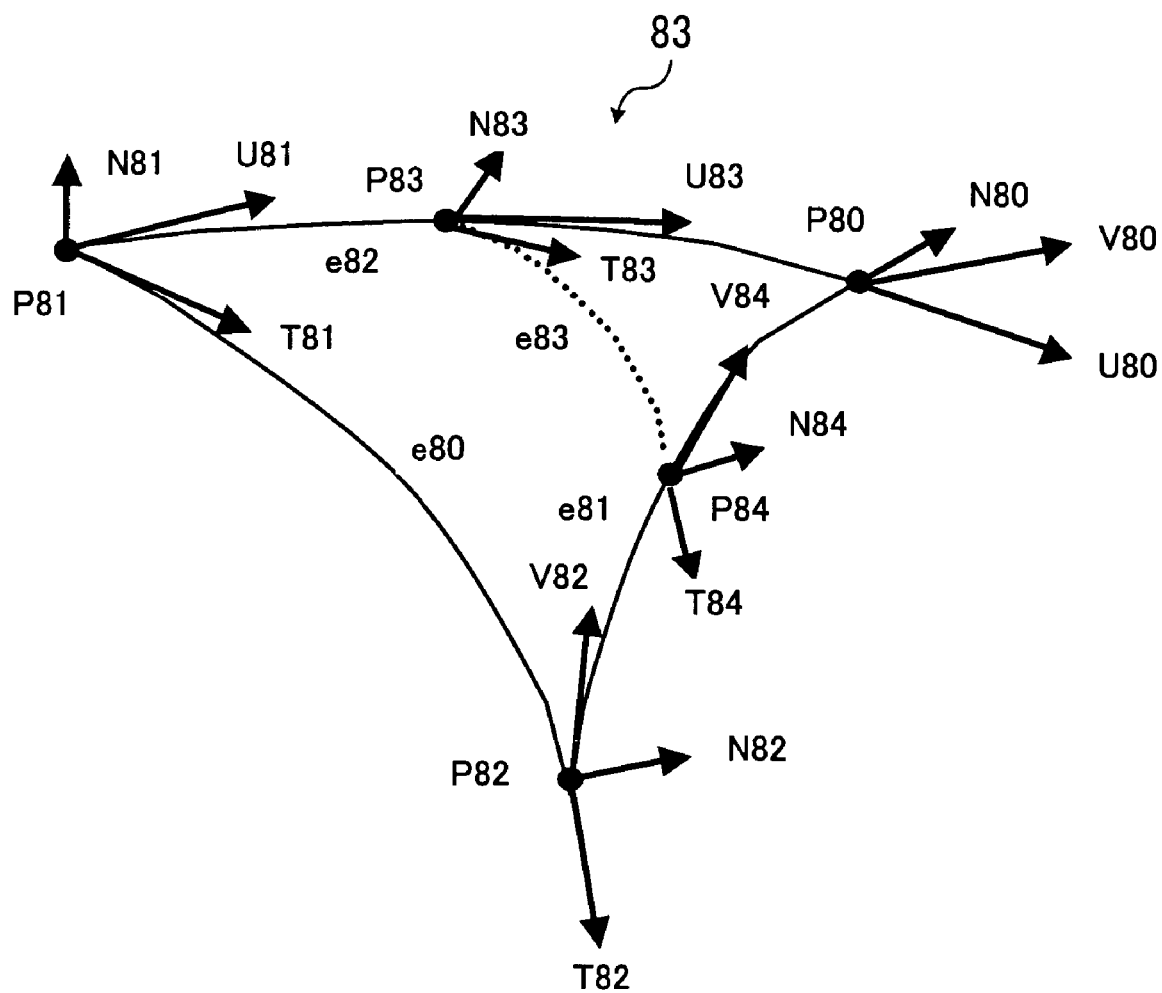
FIG. 24 shows an example of a triangle to be subdivided.

FIG. 24 shows an example of a triangle to be subdivided. In FIG. 24, P80, P81, and P82 indicate the vertices of a triangle 83 (the endpoints of the edges that form the triangle 83). N80, N81, and N82 indicate normal vectors at P80, P81, and P82 respectively. T81 and T82 indicate tangent vectors at the end points P81 and P82, respectively, of one edge. U81 and U80 indicate tangent vectors at the end points P81 and P80, respectively, of another edge. V82 and V80 indicate tangent vectors at the endpoints P82 and P80, respectively, of the other edge.

e80, e81, and e82 are information internally generated. e80, e81, and e82 indicate the edges that form a triangle, and are expressed by parametric cubic expressions.

An internal intermediate curve e83 is calculated by the method:

[ST1] A point P83 on e82 which is between P80 and P81 and which is u (0<u<1) distant from P80 is determined.

[ST2] A tangent vector U83 to e82 at P83 is determined.

[ST3] A normal vector N83 at P83 is determined.

[ST4] A tangent vector T83 is determined so that directional relationships at P83 among U83, N83, and T83 will be the same as the directional relationships at P81 among U81, N81, and T81.

[ST5] Similarly, a tangent vector T84 is determined so that directional relationships at P84 among V84, N84, and T84 will be the same as the directional relationships at P82 among V82, N82, and T82.

[ST6] A parametric cubic expression for e83 is determined from the tangent vectors T83 and T84.

A parametric cubic expression for an edge along which a triangle is subdivided can be determined in this way.

(Method for Determining Internal Intermediate Coordinates and Normal Vector in Rectangle)

A method for determining internal intermediate coordinates and a normal vector in a rectangle will now be described.

A method for determining arbitrary intermediate coordinates in a rectangle will be described first with reference to FIG. 25.

Figure 25:
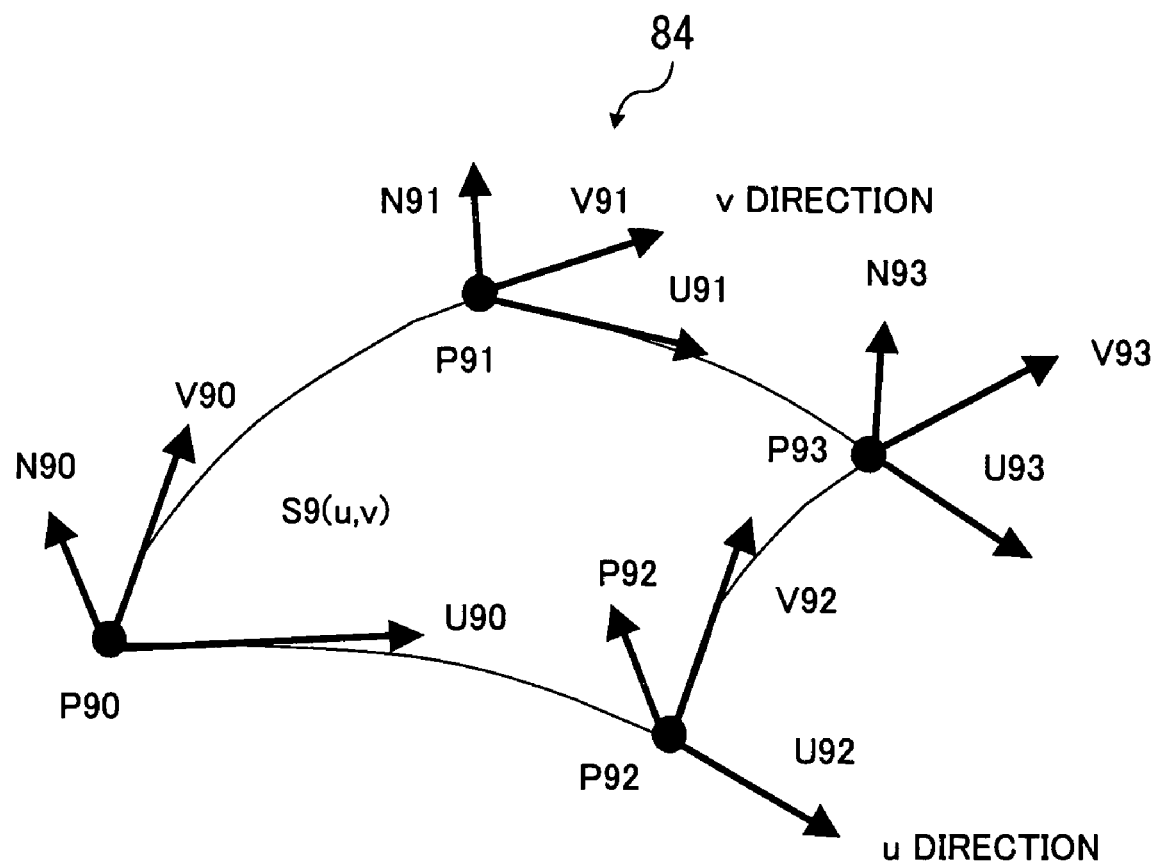
FIG. 25 shows an example of a rectangle to be subdivided.

FIG. 25 shows an example of a rectangel to be subdivided. It is assumed that an expression indicative of a rectangle 84 is $S9(u, v)$. If the rectangle 84 is a Coons curved face, then the following vector equations are given by using coordinates P90 through P93 of endpoints and u-direction vectors U90 through U93 and v-direction vectors V90 through V93 at the end points shown in FIG. 25.

$$S9(u=0, v=0)=P90$$

$$S9(u=0, v=1)=P91$$

$$S9(u=1, v=0)=P92$$

$$S9(u=1, v=1)=P93 \qquad (25)$$

$$\partial S9/\partial u(u=0, v=0)=U90$$

$$\partial S9/\partial u(u=0, v=1)=U91$$

$$\partial S9/\partial u(u=1, v=0)=U92$$

$$\partial S9/\partial u(u=1, v=1)=U93 \qquad (26)$$

$$\partial S9/\partial v(u=0, v=0)=V90$$

$$\partial S9/\partial v(u=0, v=1)=V91$$

$$\partial S9/\partial v(u=1, v=0)=V92$$

$$\partial S9/\partial v(u=1, v=1)=V93 \qquad (27)$$

By solving these simultaneous equations, $S9(u, v)$ is found. A coordinate P of an arbitrary point indicated by (u=u0, v=v0) is given by $$P=S9(u=u0, v=v0)$$

Next, a method for determining a normal vector at an arbitrary intermediate point in the rectangle will be described. A normal vector at the arbitrary point P indicated by (u=u0, v=v0) is given by the outer product of a u-direction tangent vector $\partial S9/\partial u(u=u0, v=v0)$ and a v-direction tangent vector $\partial S9/\partial v(u=u0, v=v0)$.

By performing the above processes, a three-dimensional shape can be displayed on a screen on the basis of hybrid mesh data.

(Examples of Three-Dimensional Shape Displayed on Screen)

Examples of a three-dimensional shape displayed on a screen will now be described with reference to FIGS. 26 through 30. In this embodiment, only the edges that form a three-dimensional shape can be displayed on a screen. By doing so, the structure of the three-dimensional shape can easily be recognized visually on the screen.

A three-dimensional shape, being a sphere, drawn by three-dimensional CAD will be described as an example. CAD data indicative of the sphere is converted into hybrid mesh data by the CAD data conversion section 114. As a result, the sphere is represented as, for example, an octahedron formed by eight triangles.

Figure 26:
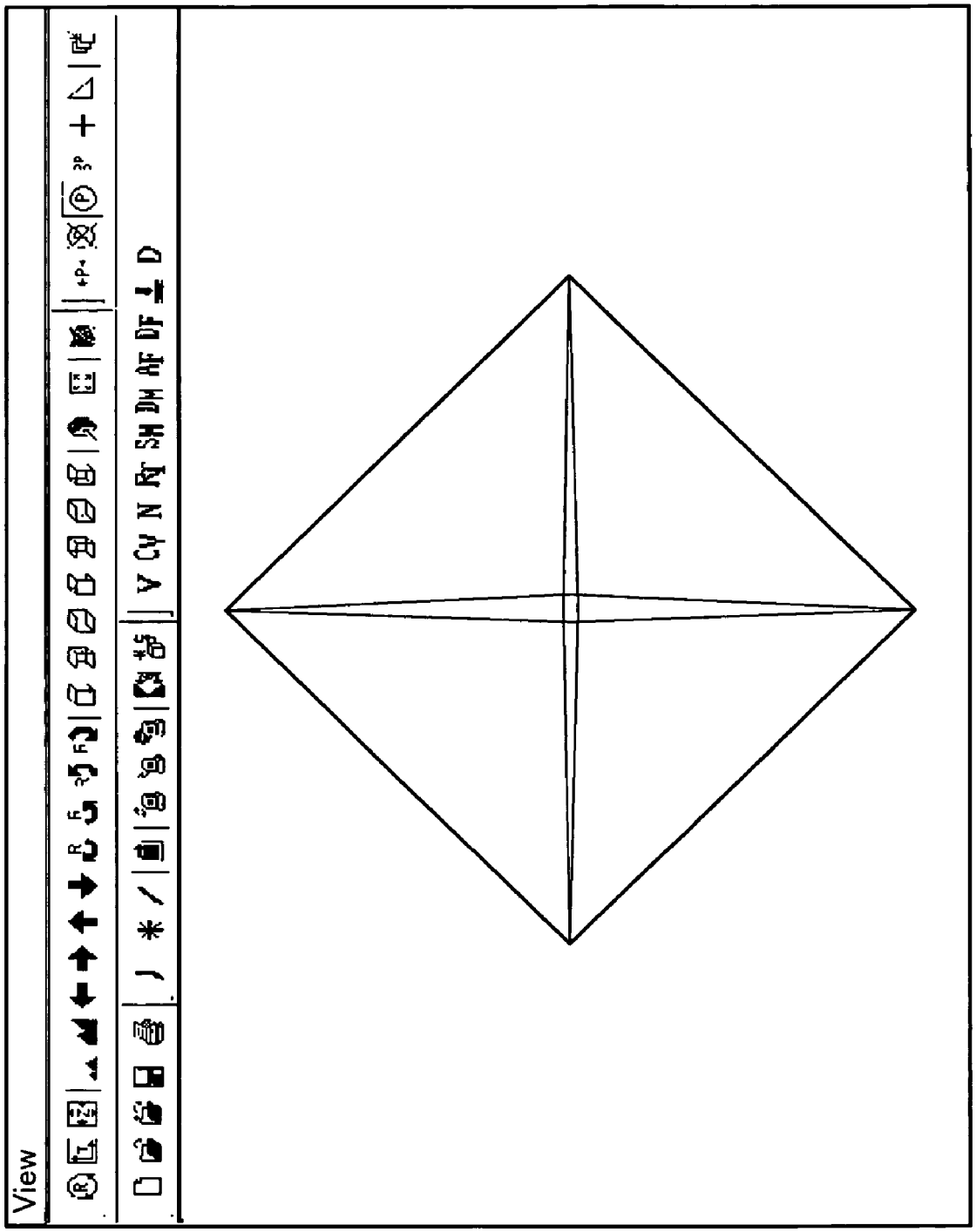
FIG. 26 shows an example of a screen on which the edges of a three-dimensional shape defined by hybrid mesh data are displayed.

FIG. 26 shows an example of a screen on which the edges of a three-dimensional shape defined by the hybrid mesh data are displayed. On the screen shown in FIG. 26, the edges of the octahedron defined by the hybrid mesh data are displayed (only a wireframe is displayed). By subdividing the hybrid mesh data that defines this structure with arbitrary accuracy, the three-dimensional shape can be displayed on the screen.

For example, when the three-dimensional shape is being turned on the screen or when a display scale is low, the three-dimensional shape will be displayed without subdividing the hybrid mesh data.

Figure 27:
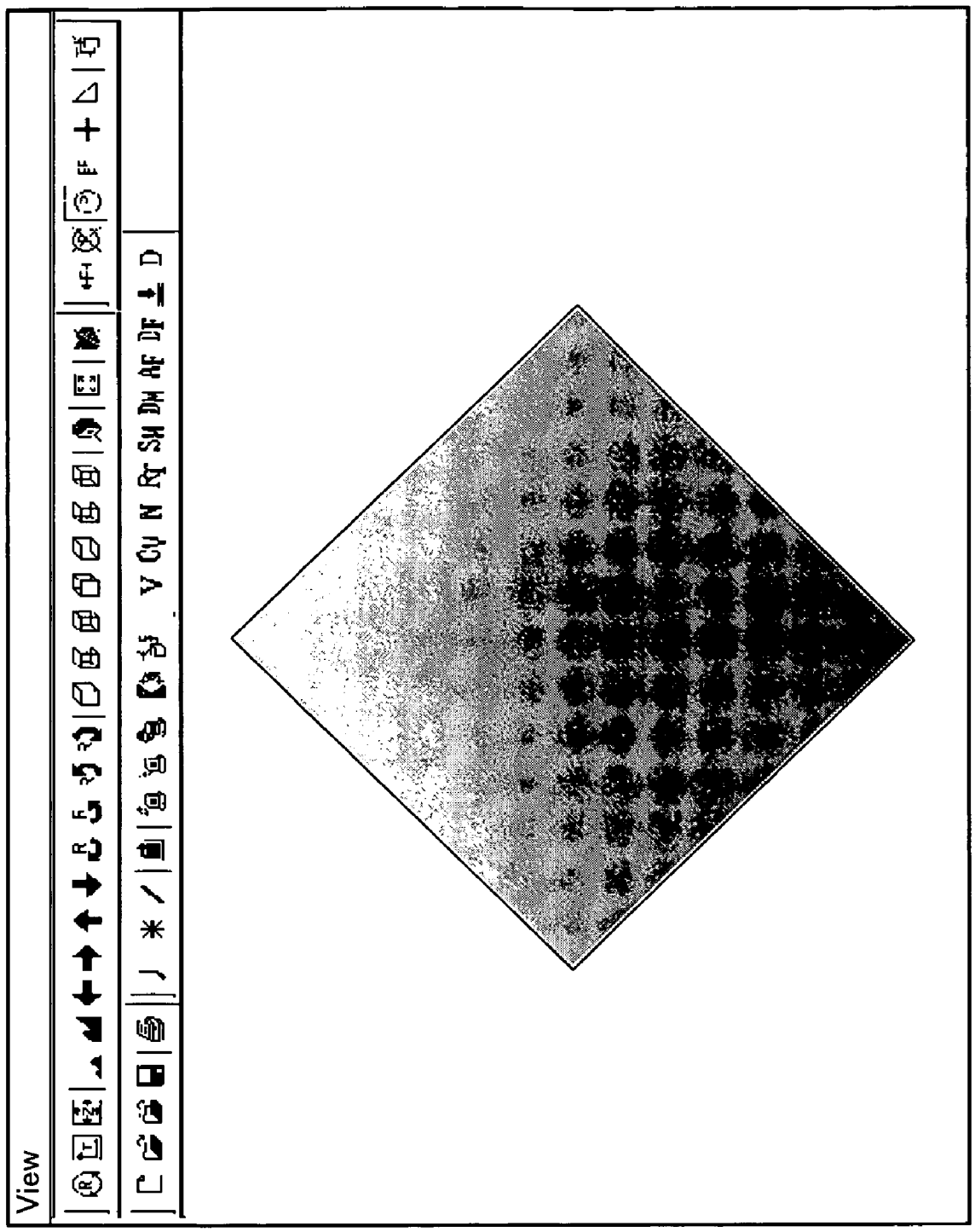
FIG. 27 shows an example of a screen on which the three-dimensional shape defined by the hybrid mesh data is displayed.

FIG. 27 shows an example of a screen on which the three-dimensional shape defined by the hybrid mesh data is displayed. On this screen, the hybrid mesh data that defines the structure shown in FIG. 26 is displayed in its original condition (without making subdivision). In this example, subdivision is not made, so the three-dimensional shape formed by eight faces is displayed. As a result, the three-dimensional shape can be displayed on the screen at a high speed.

On the other hand, when the stationary three-dimensional shape is displayed on the screen on a high display scale, the hybrid mesh data is subdivided. As a result, a three-dimensional shape indicative of the sphere will be reproduced by using a large number of faces.

Figure 28:
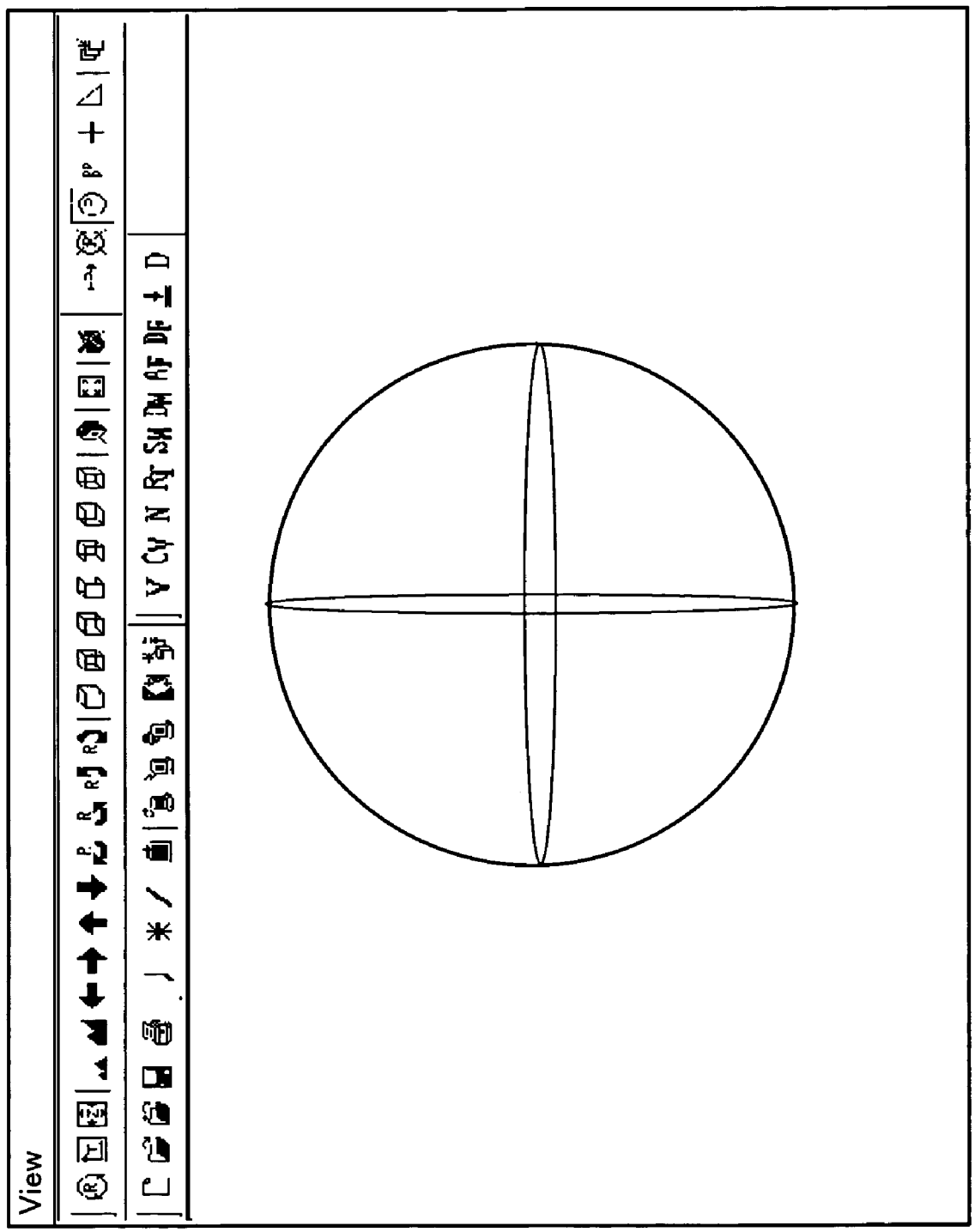
FIG. 28 shows an example of a screen on which the edges of a three-dimensional shape obtained by subdividing the hybrid mesh data are displayed.

FIG. 28 shows an example of a screen on which the edges of a three-dimensional shape obtained by subdividing the hybrid mesh data are displayed. The hybrid mesh data is subdivided, so a sphere formed by a large number of faces is displayed (only a wireframe is displayed) on the screen shown in FIG. 28.

If a three-dimensional shape is displayed on the basis of subdivided data corresponding to the structure shown in FIG. 28, its appearance will be the same as that of the sphere drawn by three-dimensional CAD.

Figure 29:
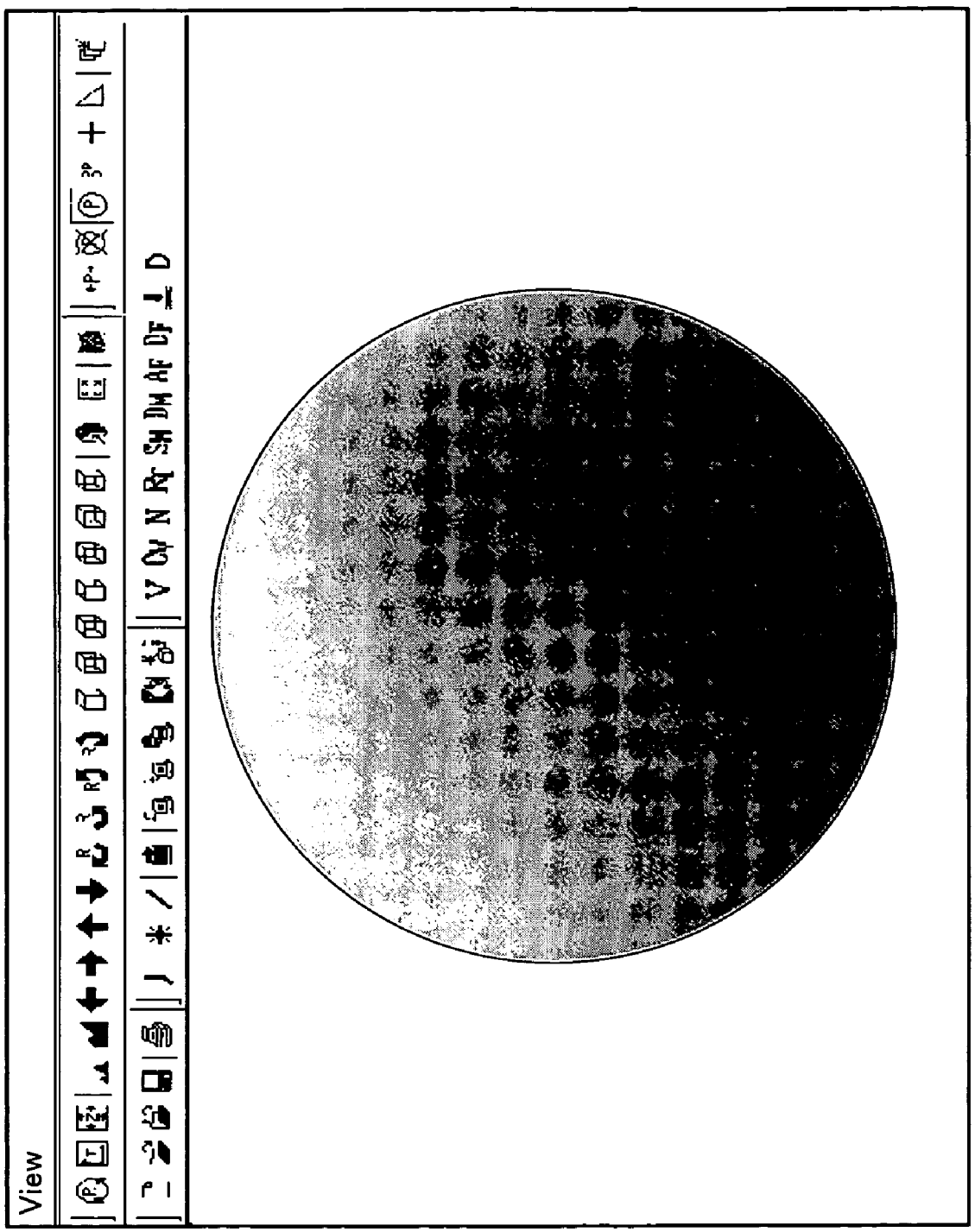
FIG. 29 shows an example of a screen on which the three-dimensional shape obtained by subdividing the hybrid mesh data is displayed.

FIG. 29 shows an example of a screen on which the three-dimensional shape obtained by subdividing the hybrid mesh data is displayed. As shown in FIG. 29, by making subdivision, the three-dimensional shape close to a sphere is displayed on the screen.

The amount of the hybrid mesh data is smaller than that of the original CAD data. Therefore, even if the original three-dimensional shape is reproduced in detail, less storage space in, for example, the HDD 103 will suffice to store the hybrid mesh data. In addition, each time polygon data is generated by subdivision, it is sent to the three-dimensional display API 140. Accordingly, there is no need to store polygon data generated by subdivision in the RAM 102. As a result, the amount of space in the RAM 102 to be used can be reduced. That is to say, even if the storage capacity of the RAM 102 is small, a three-dimensional shape created by CAD can be displayed.

By the way, when a three-dimensional shape is displayed on a screen, Gouraud shading can be performed by using normal vectors defined at the end points of each face. By performing Gouraud shading, the boundary between neighboring faces can be represented smoothly even when one face that forms the three-dimensional shape is displayed as a plane polygon. In this embodiment, a unit vector is used as a normal vector, so the general Gouraud shading can be applied.

Moreover, a small amount of storage space will suffice to display a three-dimensional shape, and a processing load caused displaying the three-dimensional shape is light. Accordingly, even a very complex three-dimensional shape can be displayed easily on a screen. For example, an automobile is designed by CAD on a collaboration system via networks and each collaborator can refer to a three-dimensional shape indicative of the structure of the automobile via a network.

Figure 30:
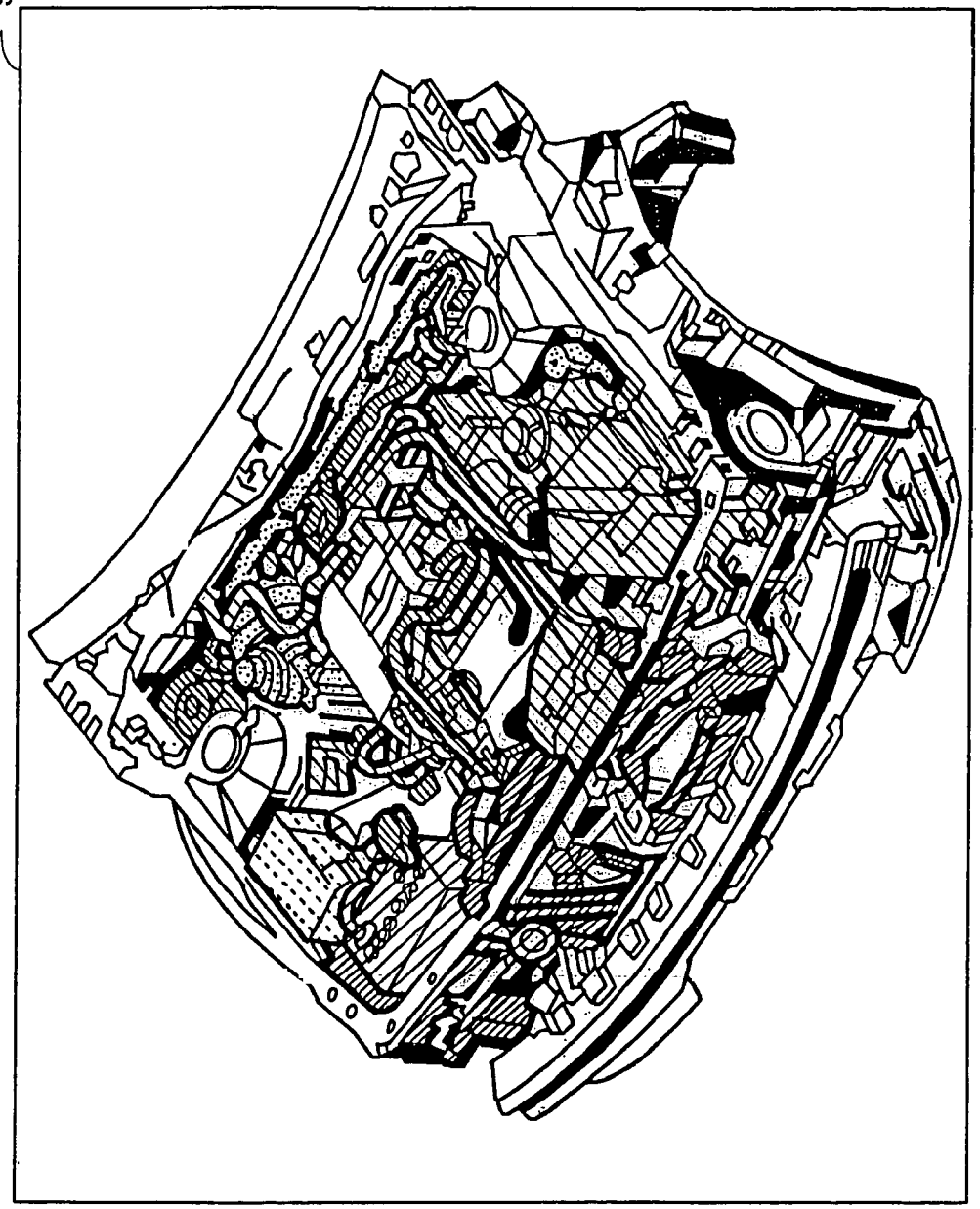
FIG. 30 shows an example of a screen on which the three-dimensional shape of an automobile is displayed.

FIG. 30 shows an example of a screen on which the three-dimensional shape of an automobile is displayed. The structure of an engine room in an automobile is displayed on the screen shown in FIG. 30. Even a three-dimensional shape having such a complex structure can be displayed easily on each computer.

As described above, a complex three-dimensional shape can be displayed on a screen under a light processing load.

In this embodiment, as shown in FIG. 10, the subdivision section 116 determines whether the relative position of a viewpoint and a three-dimensional shape (face) is changing. However, the subdivision section 116 may determine whether the relative position of a viewpoint and a three-dimensional shape (object) is changing. In that case, the process of determining whether the relative position of a viewpoint and a reference position for the three-dimensional shape (object) is changing will be performed between, for example, steps S14 and S15 in place of step S23. If the relative position of the viewpoint and the reference position for the three-dimensional shape (object) is changing, then step S18 is performed. If the relative position of the viewpoint and the reference position for the three-dimensional shape (object) is not changing, then step S15 is performed.

For example, if only a viewpoint can be moved in a virtual three-dimensional space, the subdivision section 116 may determine whether the viewpoint is moving, instead of determining whether the relative position of a viewpoint and a three-dimensional shape is changing. In that case, the process of determining whether a viewpoint is moving will be performed between, for example, steps S13 and S14 in place of step S23. If the viewpoint is moving, then the raw data for all the objects is displayed (step S18) and the process terminates. If the viewpoint is not moving, then step S14 is performed.

As described above, by simplifying the method for determining whether an object is moving on a display screen, the process can be performed at a higher speed.

The above functions can be realized with a computer. In this case, a program in which the contents of the functions the computer should have are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a digital versatile disk random access memory (DVD-RAM), a compact disk read only memory (CD-ROM), a compact disk recordable (CD-R)/rewritable (CD-RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then it reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

As has been described in the foregoing, in the present invention, the curved face shape of a face is determined on the basis of the position of the vertices of the face and the direction of normals at the vertices defined in advance in three-dimensional shape data, the face is subdivided into a plurality of faces on the curved face shape, and a three-dimensional shape is displayed. Therefore, a three-dimensional shape can be displayed with great accuracy on the basis of a small amount of three-dimensional shape data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for displaying a shape of an object in a three-dimensional space by controlling a computer to perform operations comprising:

determining a subdivision number for each side of a face constituting a three-dimensional shape on the basis of three-dimensional shape data that defines the three-dimensional shape;

determining a surface of the face on the basis of coordinates of vertices of the face and normal vectors at the vertices which are defined in advance in the three-dimensional shape data;

subdividing the determined surface according to the subdivision number determined for each edge and thereby generating a plurality of subdivided faces on the surface; and displaying the subdivided faces to represent the three-dimensional shape, wherein said subdivision number determining rounds the subdivision number of each edge to a power of 2, said subdividing recursively repeats a process of applying a predefined subdivision pattern until the determined subdivision number of each edge is reached, and when subdividing a triangle, said predefined subdivision pattern is selected from among three parameters in (N, N, N), (N, N, 1) and (N, 1, 1), wherein the three parameters in the parentheses represent subdivision numbers of three edges of the triangle, and wherein N is a power of 2 and N is greater than 1.

2. The computer-readable medium according to claim 1, wherein said subdivision number determining determines the subdivision number of each edge according to a user input regarding display accuracy.

3. The computer-readable medium according to claim 2, wherein the user input specifies a display scale.

4. The computer-readable medium according to claim 2, wherein the user input specifies a tolerance.

5. The computer-readable medium according to claim 2, wherein the user input specifies a movement of the three-dimensional shape on a display screen.

6. The computer-readable medium according to claim 2, wherein said subdivision number determining determines the subdivision number of each edge by increasing or decreasing a base subdivision numbers set in advance according to the user input.

7. The computer-readable medium according to claim 6, wherein:
the user input specifies a display scale and a tolerance; and
the subdivision number determining first determines a coefficient according to the specified display scale and tolerance and then determines the subdivision number of each edge by multiplying the base subdivision number by the coefficient.

8. The computer-readable medium according to claim 1, said surface determining determines the surface according to tangent vectors set in advance at the vertices of the face.

9. The computer-readable medium according to claim 1, wherein
said displaying determines whether the three-dimensional shape is moving on a display screen; and
if the three-dimensional shape is found moving on the display screen, said displaying displays, not the subdivide faces, but the three-dimensional shape originally defined in the three-dimensional shape data.

10. The computer-readable medium according to claim 1, wherein, in the case of subdividing a rectangle, said subdividing selectively performs either of:
subdividing the rectangle into smaller rectangles by using (M, N, M, N) as the predefined subdivision pattern, wherein the four parameters in the parentheses represent subdivision numbers of four successive edges of the rectangle, and wherein M and N are powers of 2; and
subdividing the rectangle with a diagonal line into two triangles.

11. A method for displaying the shape of an object in a three-dimensional space with a computer, the method comprising:
determining a subdivision number for each edge of a face constituting a three-dimensional shape on the basis of three-dimensional shape data that defines the three-dimensional shape;
determining a surface of the face on the basis of coordinates of vertices of the face vectors at the vertices which are defined in advance in the three-dimensional shape data;
subdividing the determined surface according to the subdivision number determined for each edge and thereby generating a plurality of subdivided faces on surface; and
displaying the subdivided faces to represent the three dimensional shape, wherein
said subdivision number determining rounds the subdivision number of each edge to a power of 2,
said subdividing recursively repeats a process of applying a predefined subdivision pattern until the determined subdivision number of each edge is reached, and
when subdividing a triangle, said predefined subdivision pattern is selected from among three parameters in (N, N, N), (N, N, 1) and (N, 1, 1), wherein, the three parameters in the parentheses represent subdivision numbers of three edges of the triangle, and wherein N is a power of 2 and N is greater than 1.

12. The method according to claim 11, wherein, in the case of subdividing a rectangle, said subdividing selectively performs either of:
subdividing the rectangle into smaller rectangles by using (M, N, M, N) as the predefined subdivision pattern, wherein the four parameters in the parentheses represent subdivision numbers of four successive edges of the rectangle, and wherein M and N are powers of 2; and
subdividing the rectangle with a diagonal line into two triangles.

13. An apparatus for displaying the shape of an object in a three-dimensional space, the apparatus comprising:
a subdivision number determination section determining a subdivision number for each edge of a face constituting a three-dimensional shape on the basis of three-dimensional shape data that defines the three-dimensional shape;
a surface determination section determining a surface of the face on the basis of coordinates of vertices of the face and normal vectors at the vertices which are defined in advance in the three-dimensional shape data;
a face generation section for subdividing the surface determined by the surface determination section according subdivision number determined for each edge and thereby generating a plurality of subdivided faces on the surface; and
a display section displaying the subdivided faces to represent the three-dimensional shape, wherein
said subdivision number determination section rounds the subdivision number of each edge to a power of 2,
said face generation section recursively repeats a process of applying a predefined subdivision pattern until the determined subdivision number of each edge is reached, and
when subdividing a triangle, said predefined subdivision pattern is selected from among three parameters in (N, N, N), (N, N, 1) and (N, 1, 1), wherein the three parameters in the parentheses represent subdivision numbers of three edges of the triangle, and wherein N is a power of 2 and N is greater than 1.

14. The apparatus according to claim 13, wherein, in the case of subdividing a rectangle, said face generation section selectively performs either of:
subdividing the rectangle into smaller rectangles by using (M, N, M, N) as the predefined subdivision pattern, wherein the four parameters in the parentheses represent subdivision numbers of four successive edges of the rectangle, and wherein M and N are powers of 2; and
subdividing the rectangle with a diagonal line into two triangles.

* * * * *